US012710528B2

(12) United States Patent
Hirzallah et al.

(10) Patent No.: US 12,710,528 B2
(45) Date of Patent: Aug. 18, 2026

(54) ARTIFICIAL INTELLIGENCE/MACHINE LEARNING (AI/ML)-BASED POSITIONING MEASUREMENT PREDICTION

(71) Applicant: QUALCOMM Incorporated, San Diego, CA (US)

(72) Inventors: Mohammed Ali Mohammed Hirzallah, San Diego, CA (US); Marwen Zorgui, San Diego, CA (US); Srinivas Yerramalli, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 485 days.

(21) Appl. No.: 18/356,764

(22) Filed: Jul. 21, 2023

(65) Prior Publication Data

US 2025/0028043 A1 Jan. 23, 2025

(51) Int. Cl.
*G01S 13/87* (2006.01)
*H04W 64/00* (2009.01)

(52) U.S. Cl.
CPC ........... *G01S 13/876* (2013.01); *H04W 64/00* (2013.01)

(58) Field of Classification Search
CPC ........ G01S 13/876; G01S 5/0236; G01S 5/10; H04W 64/00; G06N 3/044; G06N 3/045; G06N 3/08; G06N 20/00; G06N 20/10; G06N 20/20; G06N 3/084
USPC ....... 455/456.1, 422, 440; 340/988; 342/450
See application file for complete search history.

(56) References Cited

U.S. PATENT DOCUMENTS

| | | | | |
|---|---|---|---|---|
| 2019/0285722 | A1* | 9/2019 | Markhovsky | G01S 1/042 |
| 2021/0160812 | A1* | 5/2021 | Manolakos | G01S 5/0278 |
| 2021/0329414 | A1* | 10/2021 | Yerramalli | H04W 4/029 |
| 2021/0360461 | A1* | 11/2021 | Duan | G01S 7/006 |
| 2022/0046383 | A1* | 2/2022 | Nagori | G01S 5/0269 |

(Continued)

FOREIGN PATENT DOCUMENTS

WO 2023061458 A1 4/2023

OTHER PUBLICATIONS

R1-2207229, "Other aspects on AI-ML for positioning accuracy enhancement", 3GPP TSG RAN WG1 #110 Toulouse, France, Aug. 22-26, 2022. (Year: 2022).*

(Continued)

*Primary Examiner* — Juan A Torres
(74) *Attorney, Agent, or Firm* — QUALCOMM Incorporated

(57) ABSTRACT

In an aspect, a user equipment (UE) obtains, during a positioning procedure with a location server, one or more positioning measurements of one or more positioning reference signal (PRS) resources transmitted by one or more network nodes, applies a machine learning model to at least the one or more positioning measurements to obtain one or more predicted future positioning measurements associated with the one or more network nodes, and transmits positioning information to the location server. This positioning information includes the one or more positioning measurements and the one or more predicted future positioning measurements, a current position of the UE determined based, at least in part, on the one or more positioning measurements and a predicted future position of the UE determined based, at least in part, on the one or more predicted future positioning measurements, or both.

30 Claims, 21 Drawing Sheets

(56) References Cited

U.S. PATENT DOCUMENTS

| | | | | |
|---|---|---|---|---|
| 2022/0091221 | A1* | 3/2022 | Manolakos | H04W 4/029 |
| 2022/0124665 | A1* | 4/2022 | Bao | H04W 64/00 |
| 2023/0209586 | A1* | 6/2023 | Challita | H04W 28/0226 370/329 |
| 2023/0232365 | A1* | 7/2023 | Sahlin | G01S 5/0009 455/456.1 |
| 2024/0259988 | A1 | 8/2024 | Jia et al. | |
| 2025/0142291 | A1* | 5/2025 | Thomas | H04W 24/02 |

OTHER PUBLICATIONS

R1-2305001, "Discussion on AI/ML for positioning accuracy enhancement" 3GPP TSG RAN WG1 #113 R1-2305001 Incheon, KR, May 22-26, 2023. (Year: 2023).*

R1-2205029, "Other aspects on AI-ML for positioning accuracy enhancement", 3GPP TSG RAN WG1 #109-e, e-Meeting, May 9-20, 2022. (Year: 2022).*

ISA 237 Written Opinion of the International Searching Authority for WO2025024115 dated Jan. 30, 2025 (Year: 2025).*

Gang W., et al., "Discussion on AI/ML for positioning accuracy enhancement", R1-2305001, Type Discussion, FS NR AIML AIR, 33rd Generation Partnership Project, Mobile Competence Centre, 650, Route Des Lucioles, F-06921 Sophia-Antipolis Cedex, France, vol. RAN WG1, No. Incheon, May 22, 2023-May 26, 2023, May 15, 2023, XP052310447, pp. 1-7, pp. 1,3,4.

International Search Report and Written Opinion—PCT/US2024/037030—ISA/EPO—Oct. 17, 2024.

* cited by examiner

100
Location Server
172
Core Network
170
mmW BS
180
UE
182
184
122
128
134
104
160
184
120
164
102
BS
110
192
190
194
STA
152
154
AP
150
152
SC
102'
110'
SV
112
124

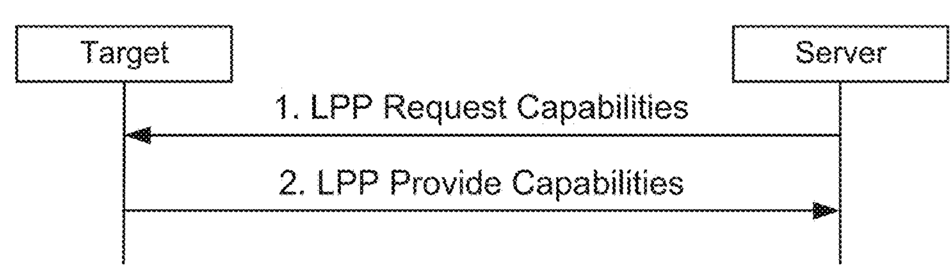
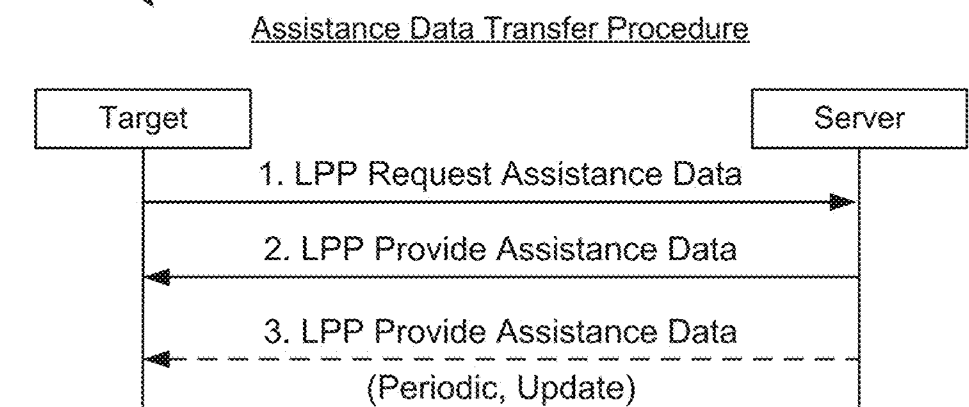
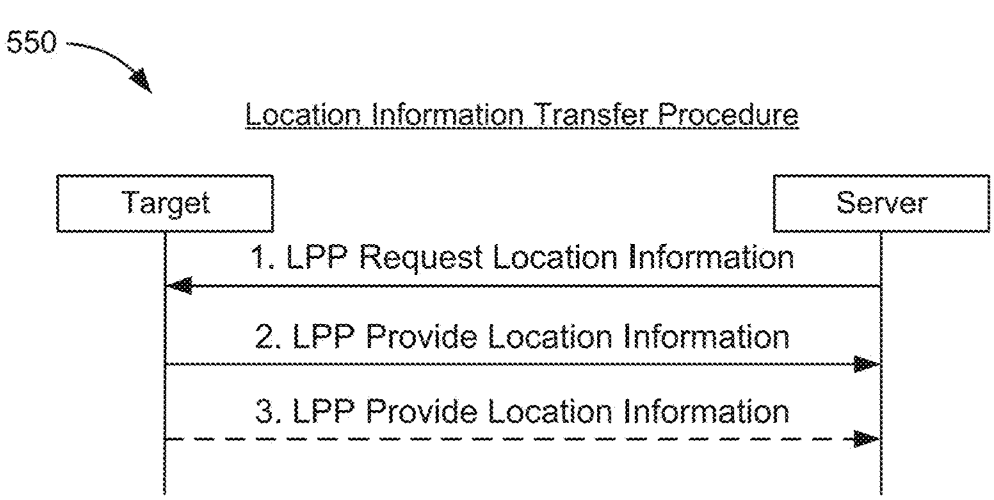
*FIG. 5*

900
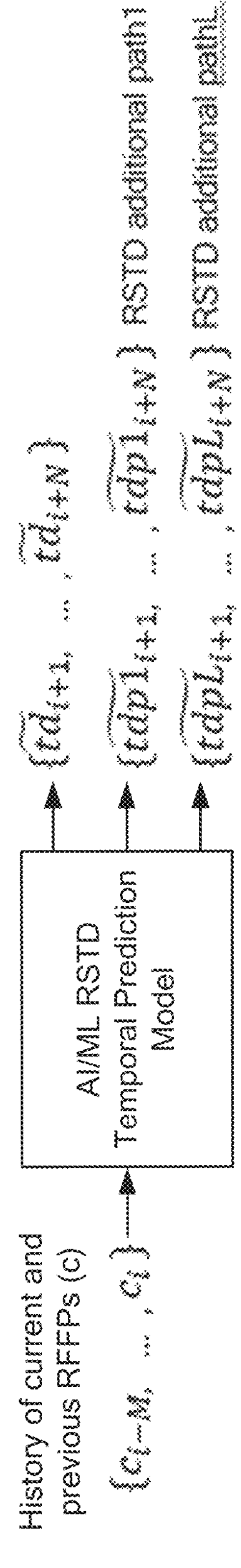
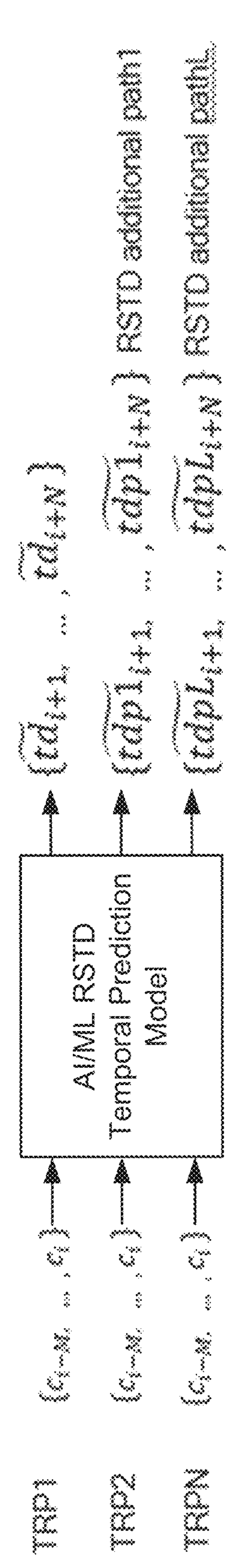
FIG. 9

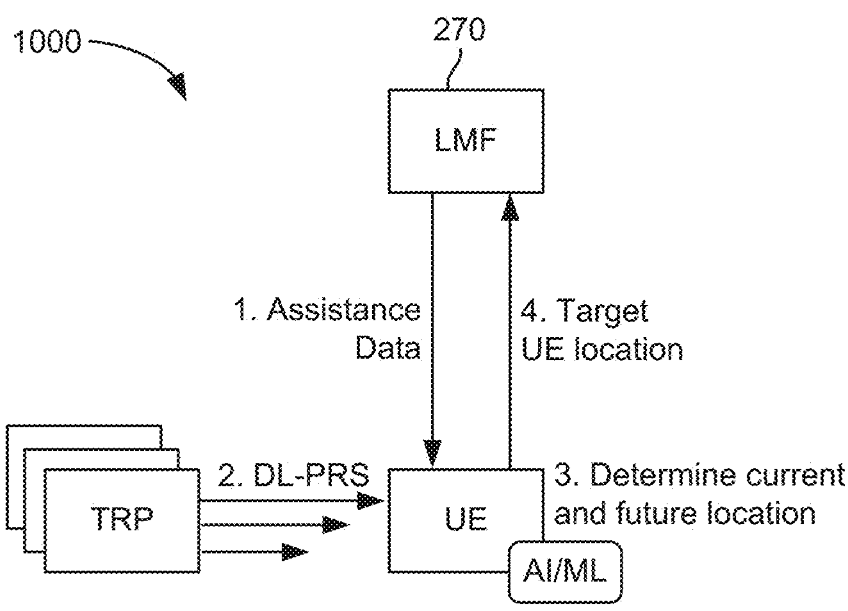
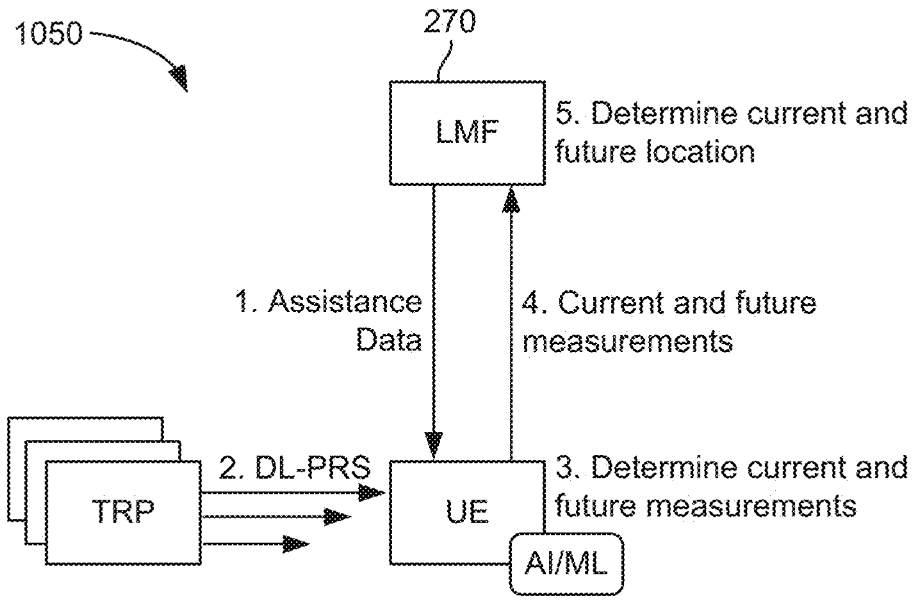
*FIG. 10*

1200
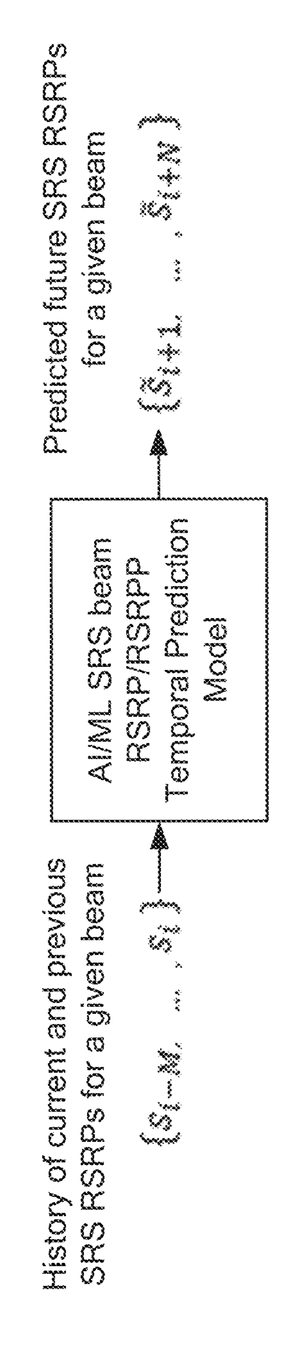
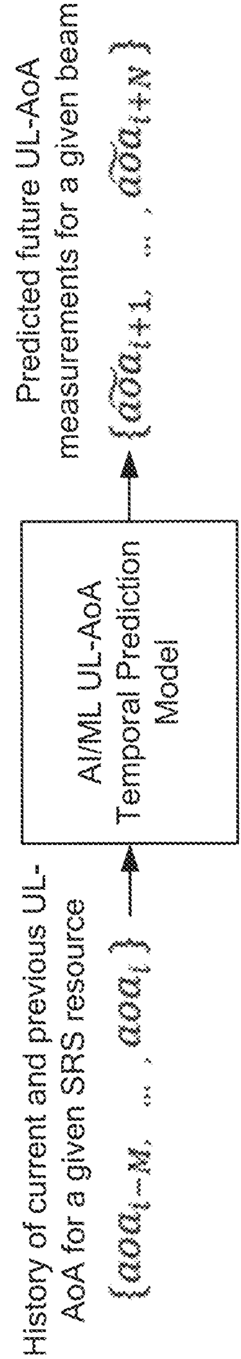
FIG. 12

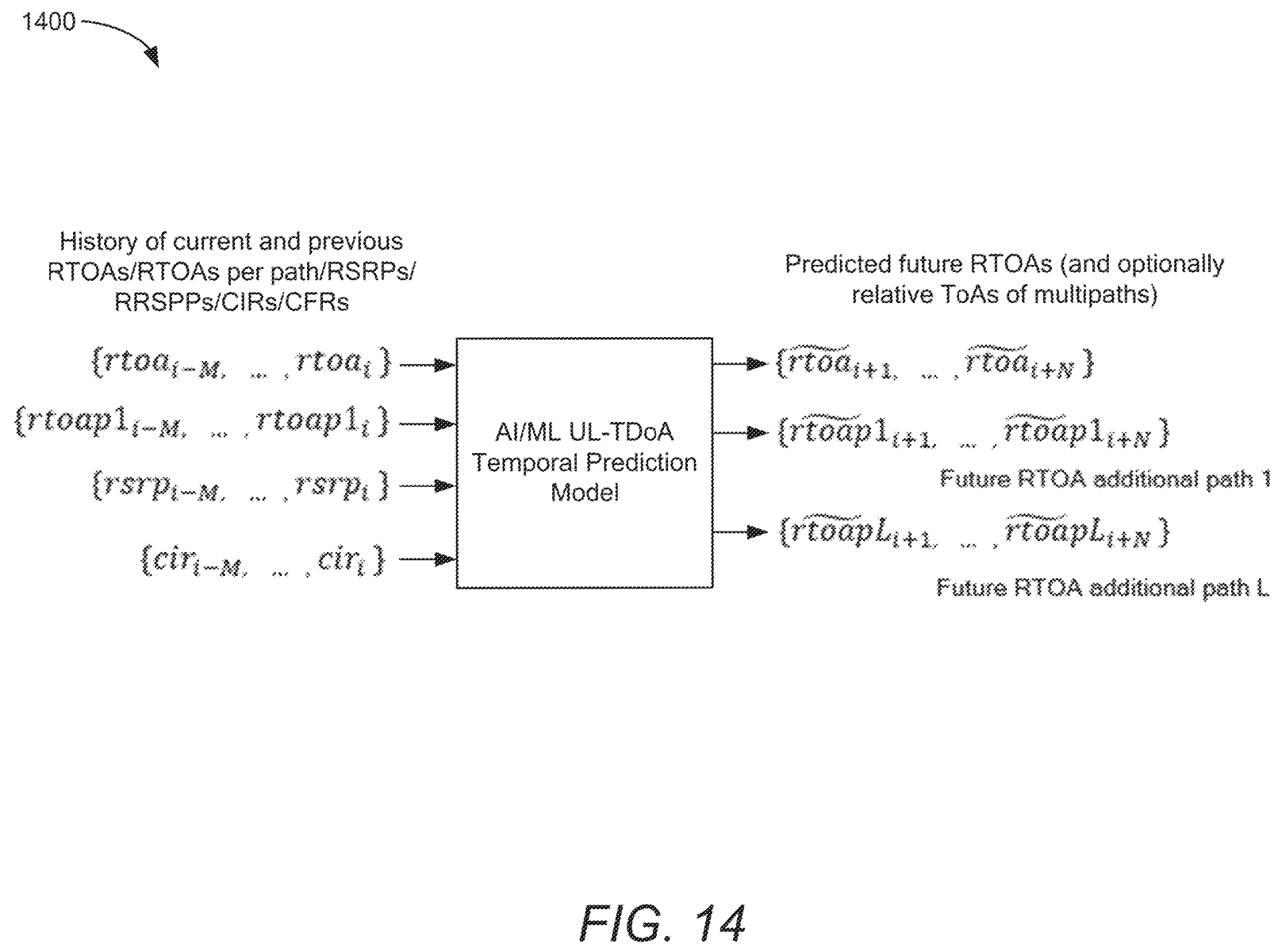

1400

History of current and previous RTOAs/RTOAs per path/RSRPs/RRSPPs/CIRs/CFRs $\{rtoa_{i-M}, \ldots, rtoa_i\}$ $\{rtoap1_{i-M}, \ldots, rtoap1_i\}$ $\{rsrp_{i-M}, \ldots, rsrp_i\}$ $\{cir_{i-M}, \ldots, cir_i\}$ AI/ML UL-TDoA Temporal Prediction Model Predicted future RTOAs (and optionally relative ToAs of multipaths)

$\{\widetilde{rtoa}_{i+1}, \ldots, \widetilde{rtoa}_{i+N}\}$ $\{\widetilde{rtoap}1_{i+1}, \ldots, \widetilde{rtoap}1_{i+N}\}$ Future RTOA additional path 1

$\{\widetilde{rtoap}L_{i+1}, \ldots, \widetilde{rtoap}L_{i+N}\}$

Future RTOA additional path L

FIG. 14

ARTIFICIAL INTELLIGENCE/MACHINE LEARNING (AI/ML)-BASED POSITIONING MEASUREMENT PREDICTION

BACKGROUND OF THE DISCLOSURE

1. Field of the Disclosure

Aspects of the disclosure relate generally to wireless technologies.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)), and other technical enhancements. These enhancements, as well as the use of higher frequency bands, advances in PRS processes and technology, and high-density deployments for 5G, enable highly accurate 5G-based positioning.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a user equipment (UE) includes obtaining, during a positioning procedure with a location server, one or more positioning measurements of one or more positioning reference signal (PRS) resources transmitted by one or more network nodes; applying a machine learning model to at least the one or more positioning measurements to obtain one or more predicted future positioning measurements associated with the one or more network nodes; and transmitting positioning information to the location server, wherein the positioning information comprises the one or more positioning measurements and the one or more predicted future positioning measurements, a current position of the UE determined based, at least in part, on the one or more positioning measurements and a predicted future position of the UE determined based, at least in part, on the one or more predicted future positioning measurements, or both.

In an aspect, a method of wireless communication performed by a network node includes obtaining one or more positioning measurements of one or more uplink reference signal resources transmitted by a user equipment (UE); applying a machine learning model to at least the one or more positioning measurements to obtain one or more predicted future positioning measurements associated with the UE; and transmitting, to a location server engaged in a positioning procedure with the UE, the one or more positioning measurements and the one or more predicted future positioning measurements.

In an aspect, a user equipment (UE) includes one or more memories; one or more transceivers; and one or more processors communicatively coupled to the one or more memories and the one or more transceivers, the one or more processors, either alone or in combination, configured to: obtain, during a positioning procedure with a location server, one or more positioning measurements of one or more positioning reference signal (PRS) resources transmitted by one or more network nodes; apply a machine learning model to at least the one or more positioning measurements to obtain one or more predicted future positioning measurements associated with the one or more network nodes; and transmit, via the one or more transceivers, positioning information to the location server, wherein the positioning information comprises the one or more positioning measurements and the one or more predicted future positioning measurements, a current position of the UE determined based, at least in part, on the one or more positioning measurements and a predicted future position of the UE determined based, at least in part, on the one or more predicted future positioning measurements, or both.

In an aspect, a network node includes one or more memories; one or more transceivers; and one or more processors communicatively coupled to the one or more memories and the one or more transceivers, the one or more processors, either alone or in combination, configured to: obtain one or more positioning measurements of one or more uplink reference signal resources transmitted by a user equipment (UE); apply a machine learning model to at least the one or more positioning measurements to obtain one or more predicted future positioning measurements associated with the UE; and transmit, via the one or more transceivers, to a location server engaged in a positioning procedure with the UE, the one or more positioning measurements and the one or more predicted future positioning measurements.

In an aspect, a user equipment (UE) includes means for obtaining, during a positioning procedure with a location server, one or more positioning measurements of one or more positioning reference signal (PRS) resources transmitted by one or more network nodes; means for applying a machine learning model to at least the one or more positioning measurements to obtain one or more predicted future positioning measurements associated with the one or more network nodes; and means for transmitting positioning information to the location server, wherein the positioning information comprises the one or more positioning measurements and the one or more predicted future positioning measurements, a current position of the UE determined based, at least in part, on the one or more positioning measurements and a predicted future position of the UE determined based, at least in part, on the one or more predicted future positioning measurements, or both.

In an aspect, a network node includes means for obtaining one or more positioning measurements of one or more uplink reference signal resources transmitted by a user equipment (UE); means for applying a machine learning model to at least the one or more positioning measurements to obtain one or more predicted future positioning measurements associated with the UE; and means for transmitting, to a location server engaged in a positioning procedure with the UE, the one or more positioning measurements and the one or more predicted future positioning measurements.

In an aspect, a non-transitory computer-readable medium stores computer-executable instructions that, when executed by a user equipment (UE), cause the UE to: obtain, during a positioning procedure with a location server, one or more positioning measurements of one or more positioning reference signal (PRS) resources transmitted by one or more network nodes; apply a machine learning model to at least the one or more positioning measurements to obtain one or more predicted future positioning measurements associated with the one or more network nodes; and transmit positioning information to the location server, wherein the positioning information comprises the one or more positioning measurements and the one or more predicted future positioning measurements, a current position of the UE determined based, at least in part, on the one or more positioning measurements and a predicted future position of the UE determined based, at least in part, on the one or more predicted future positioning measurements, or both.

In an aspect, a non-transitory computer-readable medium stores computer-executable instructions that, when executed by a network node, cause the network node to: obtain one or more positioning measurements of one or more uplink reference signal resources transmitted by a user equipment (UE); apply a machine learning model to at least the one or more positioning measurements to obtain one or more predicted future positioning measurements associated with the UE; and transmit, to a location server engaged in a positioning procedure with the UE, the one or more positioning measurements and the one or more predicted future positioning measurements.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 5 illustrates an example Long-Term Evolution (LTE) positioning protocol (LPP) capability transfer procedure, assistance data transfer procedure, and location information transfer procedure between a target device and a location server, according to aspects of the disclosure.

FIG. 9 is a diagram illustrating an example of reference signal time difference (RSTD) temporal prediction, according to aspects of the disclosure.

FIG. 10 illustrates example artificial intelligence/machine learning (AI/ML) positioning scenarios with a UE-side AI/ML model, according to aspects of the disclosure.

FIG. 12 is a diagram illustrating an example of sounding reference signal reference signal received power/reference signal received path power/angle of arrival (SRS RSRP/RSRPP/AoA) temporal prediction, according to aspects of the disclosure.

FIG. 14 is a diagram illustrating an example of uplink relative time of arrival (UL-RTOA) temporal prediction, according to aspects of the disclosure.

DETAILED DESCRIPTION

Figure 1:
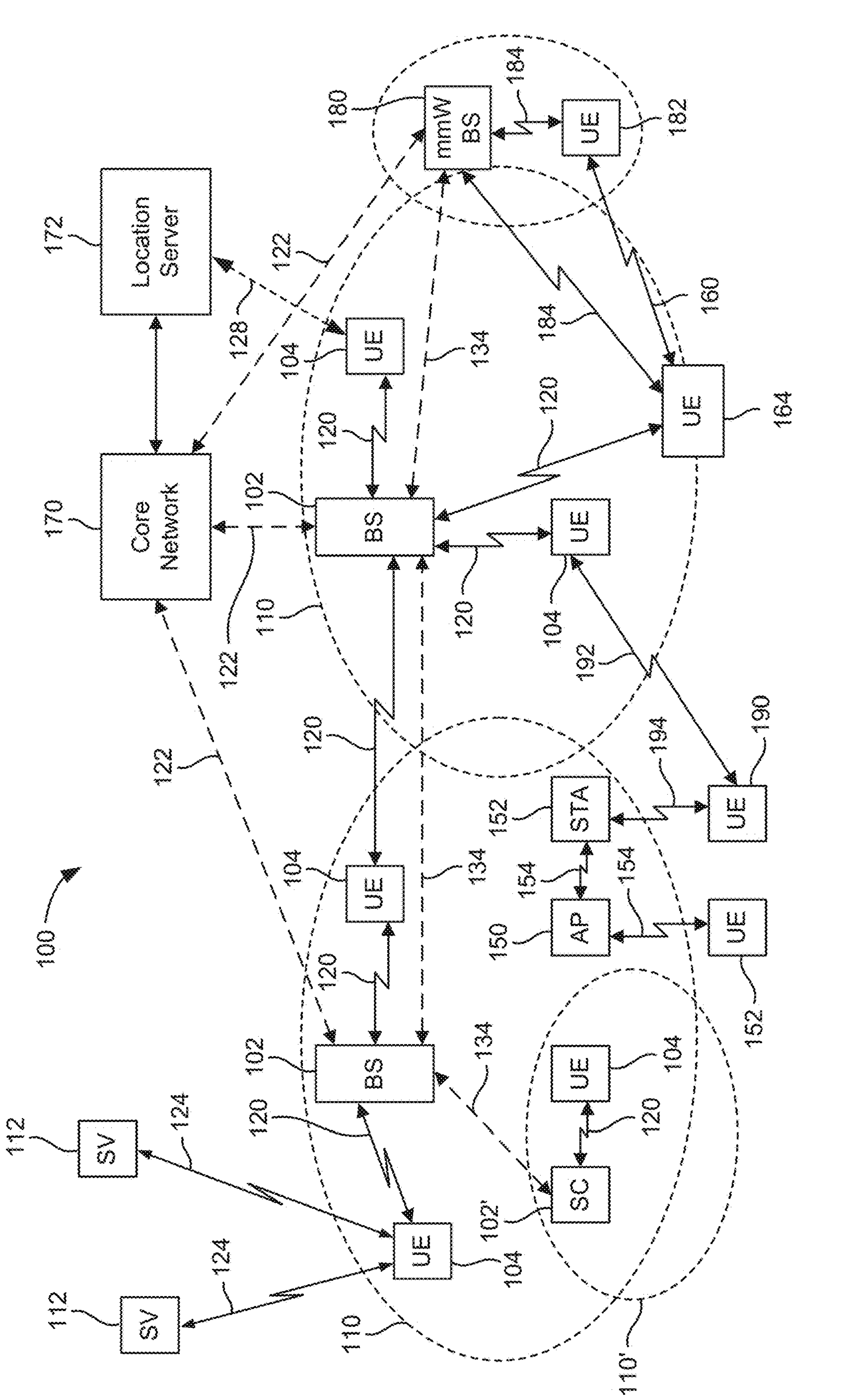
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

Various aspects relate generally to wireless positioning. Some aspects more specifically relate to artificial intelligence/machine learning (AI/ML)-based positioning measurement prediction. In some examples, a user equipment (UE) obtains, during a positioning procedure with a location server, one or more positioning measurements of one or more positioning reference signal (PRS) resources transmitted by one or more network nodes. The UE applies a machine learning model to at least the one or more positioning measurements to obtain one or more predicted future positioning measurements associated with the one or more network nodes. The UE then transmits positioning information to the location server. The positioning information may include the one or more positioning measurements and the one or more predicted future positioning measurements, a current position of the UE determined based, at least in part, on the one or more positioning measurements and a predicted future position of the UE determined based, at least in part, on the one or more predicted future positioning measurements, or both.

In some examples, a network node (e.g., a base station or a component of a base station) may obtain one or more positioning measurements of one or more uplink positioning reference signal (UL-PRS) resources transmitted by a UE. The network node applies a machine learning model to at least the one or more positioning measurements to obtain one or more predicted future positioning measurements associated with the UE. The network node transmits, to a location server engaged in a positioning procedure with the UE, the one or more positioning measurements and the one or more predicted future positioning measurements.

Particular aspects of the subject matter described in this disclosure can be implemented to realize one or more of the following potential advantages. In some examples, by obtaining the one or more predicted future positioning measurements, the described techniques can be used to reduce signaling overhead (e.g., fewer/sparse PRS resources and UL-PRS resources are needed), reduce power consumption at the UE, and provide more accurate measurements/positioning.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation cNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHZ). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MULTEFIRE®.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHZ, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHZ-7.125 GHZ) and FR2 (24.25 GHz-52.6 GHZ). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the INTERNATIONAL TELECOMMUNICATION UNION® as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHZ), FR4 (52.6 GHz-114.25 GHZ), and FR5 (114.25 GHZ-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHZ), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In some cases, the UE 164 and the UE 182 may be capable of sidelink communication. Sidelink-capable UEs (SL-UEs) may communicate with base stations 102 over communication links 120 using the Uu interface (i.e., the air interface between a UE and a base station). SL-UEs (e.g., UE 164, UE 182) may also communicate directly with each other over a wireless sidelink 160 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (cV2X) communication, etc.), emergency rescue applications, etc. One or more of a group of SL-UEs utilizing sidelink communications may be within the geographic coverage area 110 of a base station 102. Other SL-UEs in such a group may be outside the geographic coverage area 110 of a base station 102 or be otherwise unable to receive transmissions from a base station 102. In some cases, groups of SL-UEs communicating via sidelink communications may utilize a one-to-many (1:M) system in which each SL-UE transmits to every other SL-UE in the group. In some cases, a base station 102 facilitates the scheduling of resources for sidelink communications. In other cases, sidelink communications are carried out between SL-UEs without the involvement of a base station 102.

In an aspect, the sidelink 160 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. In an aspect, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Note that although FIG. 1 only illustrates two of the UEs as SL-UEs (i.e., UEs 164 and 182), any of the illustrated UEs may be SL-UEs. Further, although only UE 182 was described as being capable of beamforming, any of the illustrated UEs, including UE 164, may be capable of beamforming. Where SL-UEs are capable of beamforming, they may beamform towards each other (i.e., towards other SL-UEs), towards other UEs (e.g., UEs 104), towards base stations (e.g., base stations 102, 180, small cell 102', access point 150), etc. Thus, in some cases, UEs 164 and 182 may utilize beamforming over sidelink 160.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect. SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WI-FI DIRECT®, BLUETOOTH®, and so on.

Figure 2A:
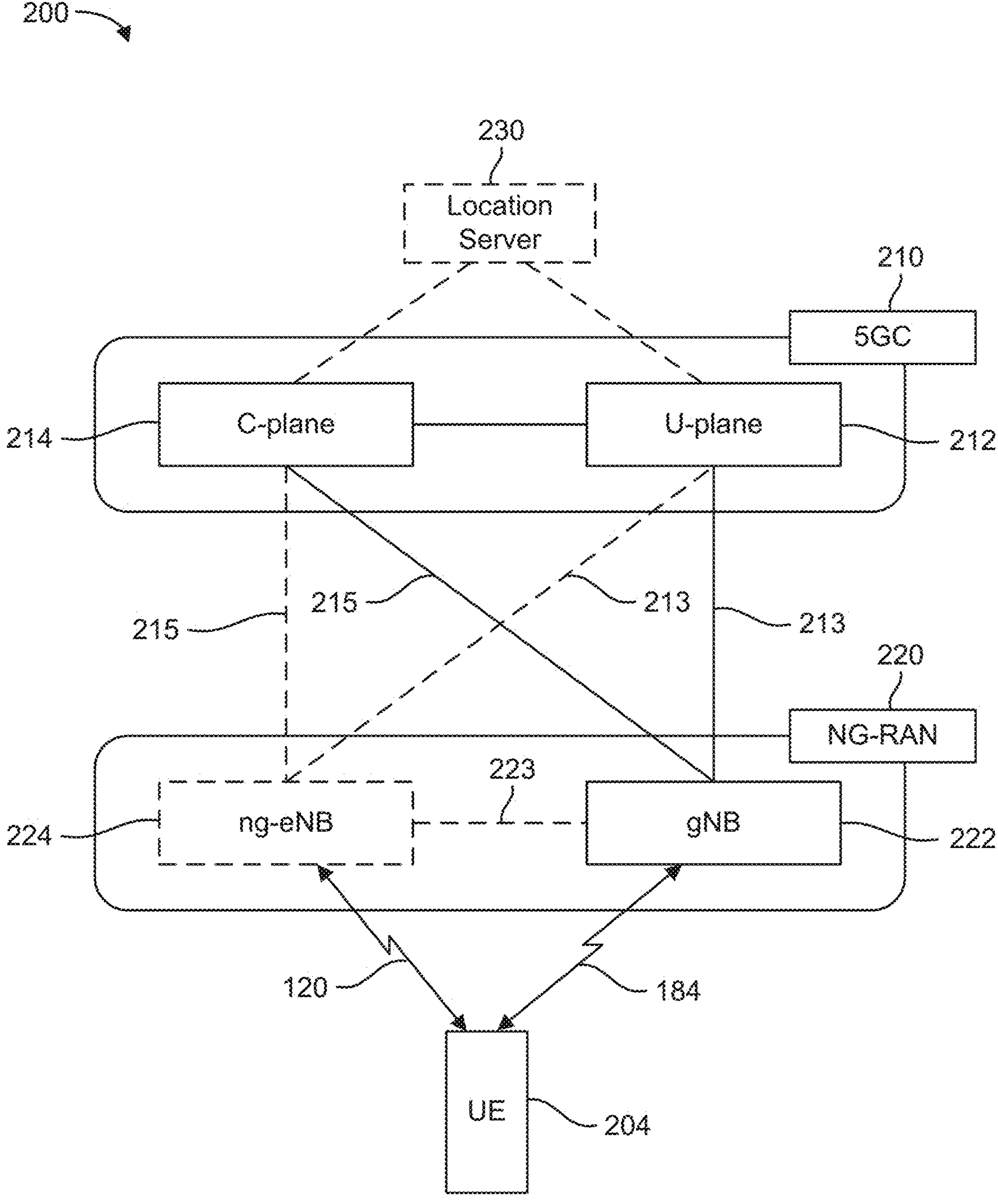
FIGS. 2A, 2B, and 2C illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
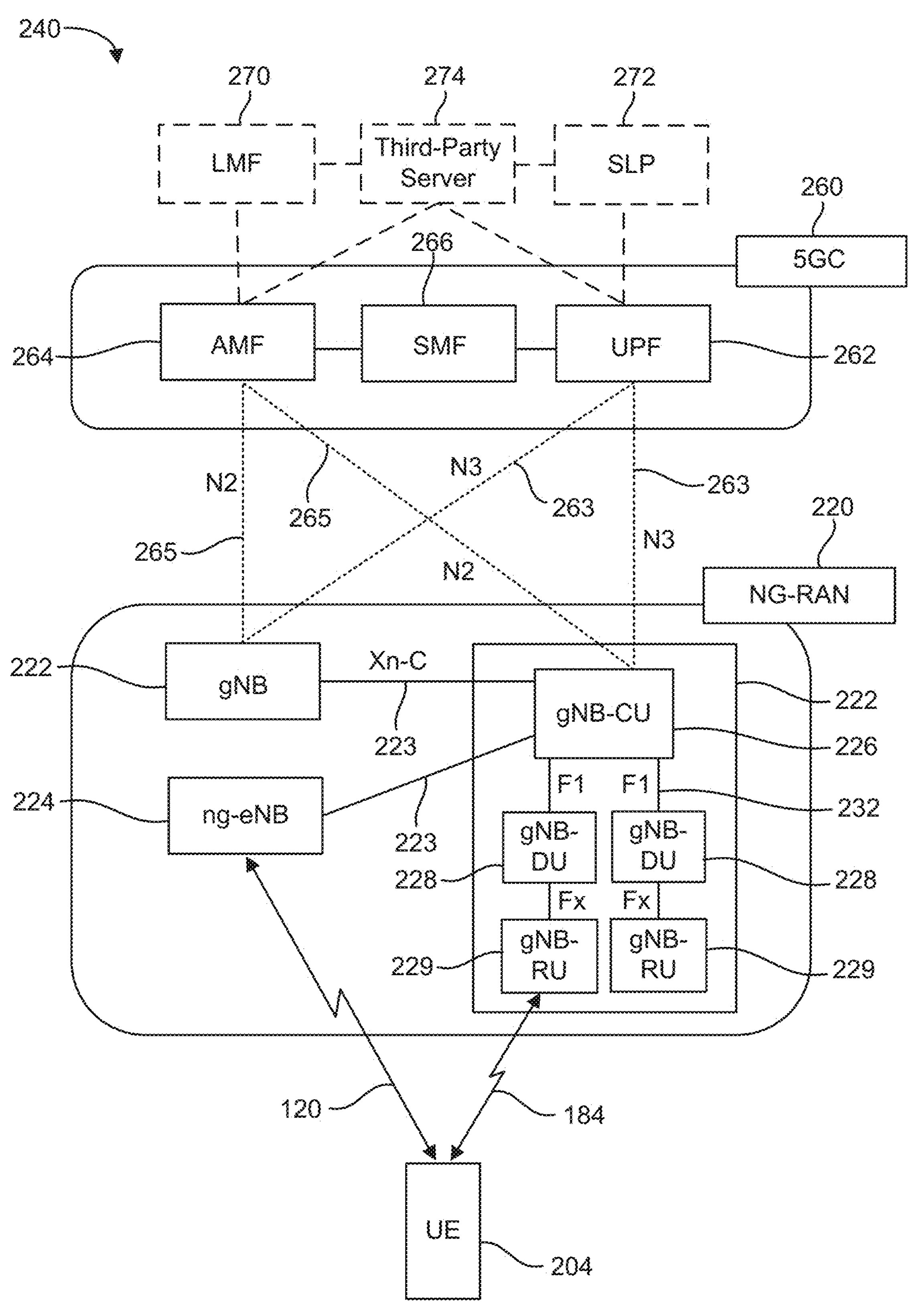

FIG. 2B illustrates another example wireless network structure 240. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP® (Third Generation Partnership Project) access networks.

Functions of the UPF 262 include acting as an anchor point for intra/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QOS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-cNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station, or one or more units (or one or more components) performing base station functionality, may be implemented in an aggregated or disaggregated architecture. For example, a base station (such as a Node B (NB), evolved NB (eNB), NR base station, 5G NB, access point (AP), a transmit receive point (TRP), or a cell, etc.) may be implemented as an aggregated base station (also known as a standalone base station or a monolithic base station) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN ALLIANCE®)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2C:
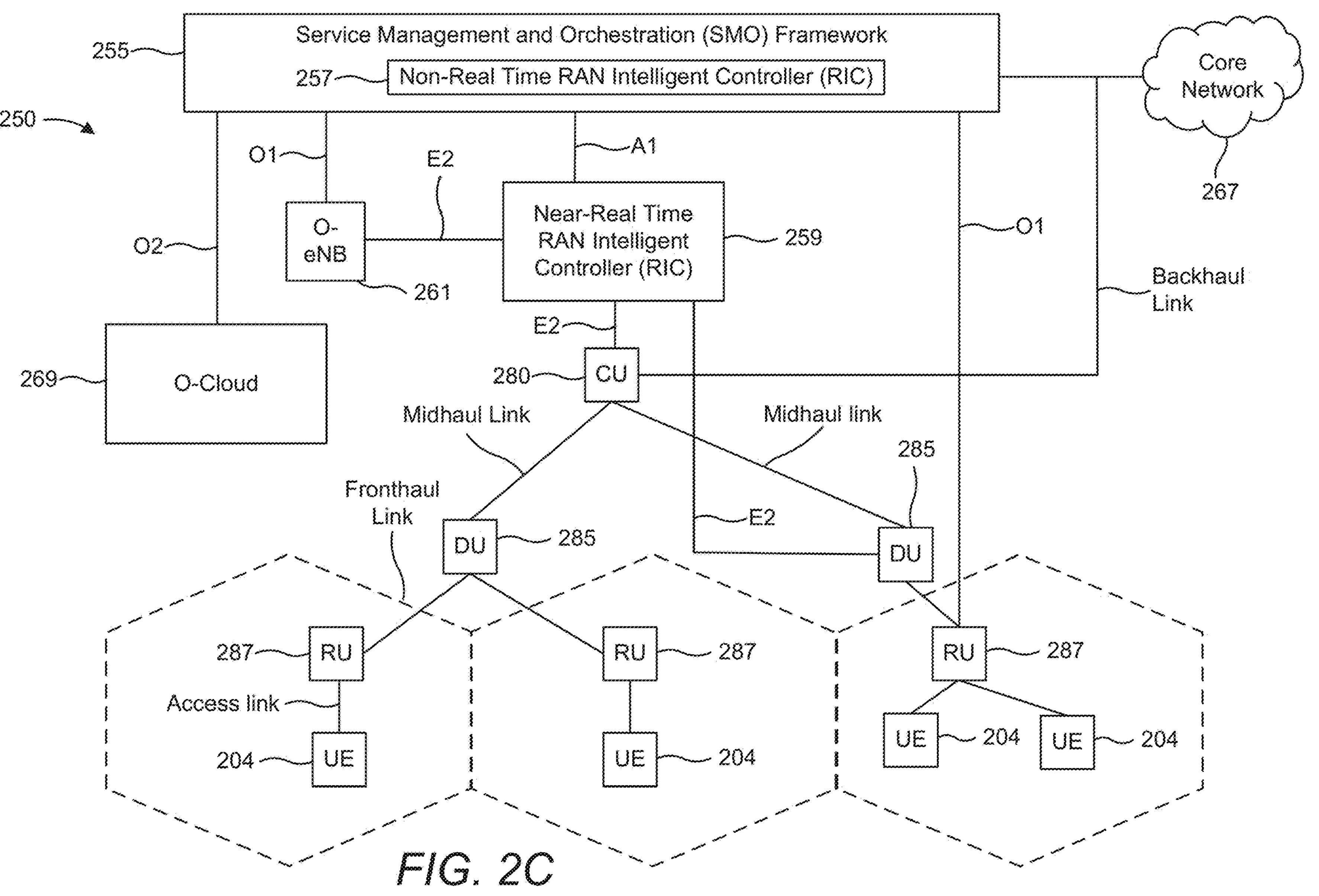

FIG. 2C illustrates an example disaggregated base station architecture 250, according to aspects of the disclosure. The disaggregated base station architecture 250 may include one or more central units (CUs) 280 (e.g., gNB-CU 226) that can communicate directly with a core network 267 (e.g., 5GC 210, 5GC 260) via a backhaul link, or indirectly with the core network 267 through one or more disaggregated base station units (such as a Near-Real Time (Near-RT) RAN Intelligent Controller (RIC) 259 via an E2 link, or a Non-Real Time (Non-RT) RIC 257 associated with a Service Management and Orchestration (SMO) Framework 255, or both). A CU 280 may communicate with one or more DUs 285 (e.g., gNB-DUs 228) via respective midhaul links, such as an F1 interface. The DUs 285 may communicate with one or more radio units (RUS) 287 (e.g., gNB-RUs 229) via respective fronthaul links. The RUs 287 may communicate with respective UEs 204 via one or more radio frequency (RF) access links. In some implementations, the UE 204 may be simultaneously served by multiple RUs 287.

Each of the units, i.e., the CUS 280, the DUs 285, the RUs 287, as well as the Near-RT RICs 259, the Non-RT RICs 257 and the SMO Framework 255, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a RF transceiver), configured to receive or transmit signals, or both, over a wireless transmission medium to one or more of the other units.

In some aspects, the CU 280 may host one or more higher layer control functions. Such control functions can include RRC, PDCP, service data adaptation protocol (SDAP), or the like. Each control function can be implemented with an interface configured to communicate signals with other control functions hosted by the CU 280. The CU 280 may be configured to handle user plane functionality (i.e., Central Unit-User Plane (CU-UP)), control plane functionality (i.e., Central Unit-Control Plane (CU-CP)), or a combination thereof. In some implementations, the CU 280 can be logically split into one or more CU-UP units and one or more CU-CP units. The CU-UP unit can communicate bidirectionally with the CU-CP unit via an interface, such as the E1 interface when implemented in an O-RAN configuration. The CU 280 can be implemented to communicate with the DU 285, as necessary, for network control and signaling.

The DU 285 may correspond to a logical unit that includes one or more base station functions to control the operation of one or more RUs 287. In some aspects, the DU 285 may host one or more of a RLC layer, a MAC layer, and one or more high PHY layers (such as modules for forward error correction (FEC) encoding and decoding, scrambling, modulation and demodulation, or the like) depending, at least in part, on a functional split, such as those defined by the 3rd Generation Partnership Project (3GPP®). In some aspects, the DU 285 may further host one or more low PHY layers. Each layer (or module) can be implemented with an interface configured to communicate signals with other layers (and modules) hosted by the DU 285, or with the control functions hosted by the CU 280.

Lower-layer functionality can be implemented by one or more RUs 287. In some deployments, an RU 287, controlled by a DU 285, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 287 can be implemented to handle over the air (OTA) communication with one or more UEs 204. In some implementations, real-time and non-real-time aspects of control and user plane communication with the RU(s) 287 can be controlled by the corresponding DU 285. In some scenarios, this configuration can enable the DU(s) 285 and the CU 280 to be implemented in a cloud-based RAN architecture, such as a vRAN architecture.

The SMO Framework 255 may be configured to support RAN deployment and provisioning of non-virtualized and virtualized network elements. For non-virtualized network elements, the SMO Framework 255 may be configured to support the deployment of dedicated physical resources for RAN coverage requirements which may be managed via an operations and maintenance interface (such as an O1 interface). For virtualized network elements, the SMO Framework 255 may be configured to interact with a cloud computing platform (such as an open cloud (O-Cloud) 269) to perform network element life cycle management (such as to instantiate virtualized network elements) via a cloud computing platform interface (such as an O2 interface). Such virtualized network elements can include, but are not limited to, CUs 280, DUs 285, RUs 287 and Near-RT RICs 259. In some implementations, the SMO Framework 255 can communicate with a hardware aspect of a 4G RAN, such as an open eNB (O-cNB) 261, via an O1 interface. Additionally, in some implementations, the SMO Framework 255 can communicate directly with one or more RUs 287 via an O1 interface. The SMO Framework 255 also may include a Non-RT RIC 257 configured to support functionality of the SMO Framework 255.

The Non-RT RIC 257 may be configured to include a logical function that enables non-real-time control and optimization of RAN elements and resources, artificial intelligence/machine learning (AI/ML) workflows including model training and updates, or policy-based guidance of applications/features in the Near-RT RIC 259. The Non-RT RIC 257 may be coupled to or communicate with (such as via an A1 interface) the Near-RT RIC 259. The Near-RT RIC 259 may be configured to include a logical function that enables near-real-time control and optimization of RAN elements and resources via data collection and actions over an interface (such as via an E2 interface) connecting one or more CUs 280, one or more DUs 285, or both, as well as an O-eNB, with the Near-RT RIC 259.

In some implementations, to generate AI/ML models to be deployed in the Near-RT RIC 259, the Non-RT RIC 257 may receive parameters or external enrichment information from external servers. Such information may be utilized by the Near-RT RIC 259 and may be received at the SMO Framework 255 or the Non-RT RIC 257 from non-network data sources or from network functions. In some examples, the Non-RT RIC 257 or the Near-RT RIC 259 may be configured to tune RAN behavior or performance. For example, the Non-RT RIC 257 may monitor long-term trends and patterns for performance and employ AI/ML models to perform corrective actions through the SMO Framework 255 (such as reconfiguration via 01) or via creation of RAN management policies (such as A1 policies).

Figure 3A:
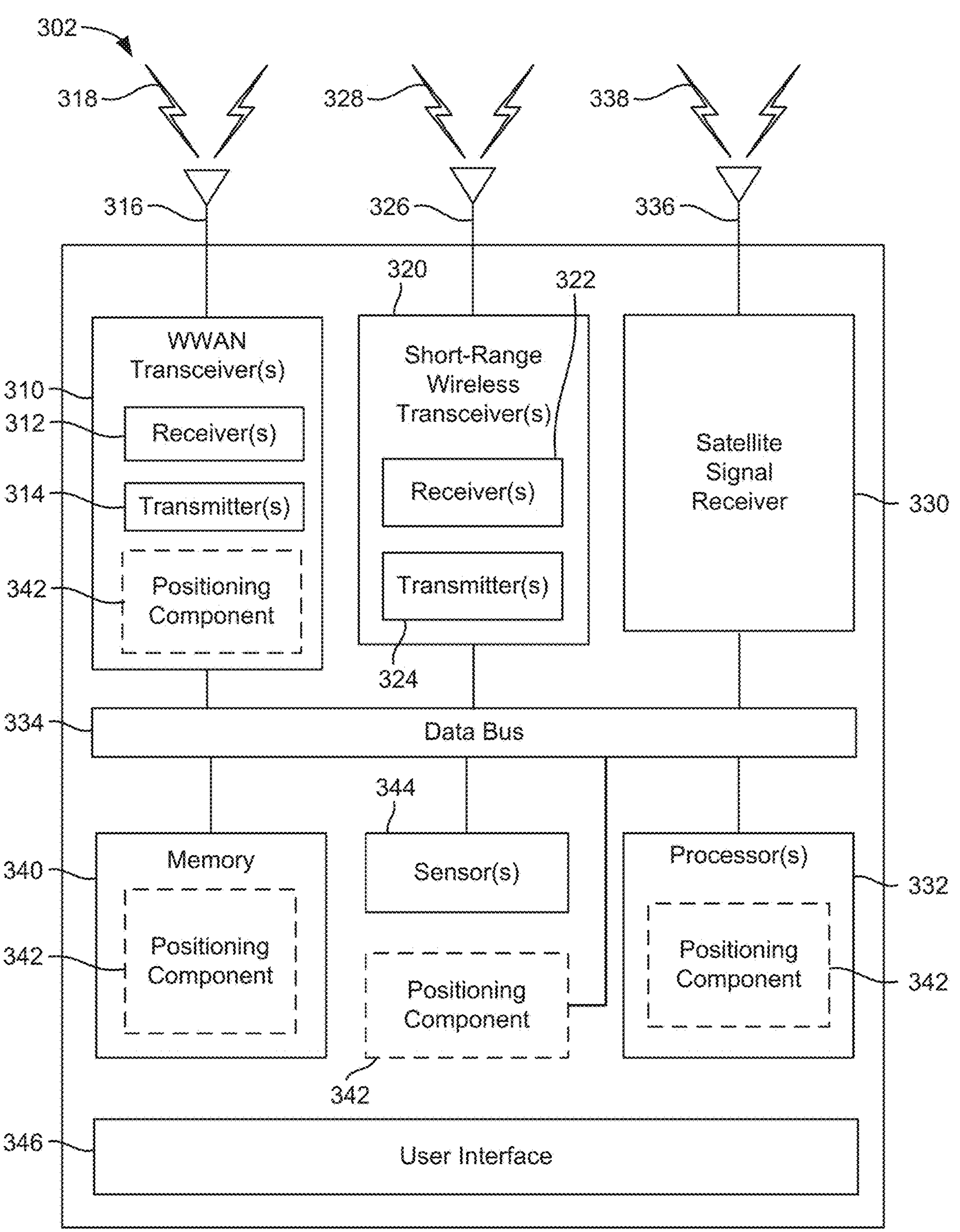
FIGS. 3A, 3B, and 3C are simplified block diagrams of several sample aspects of components that may be employed in a user equipment (UE), a base station, and a network entity, respectively, and configured to support communications as taught herein.
Figure 3B:
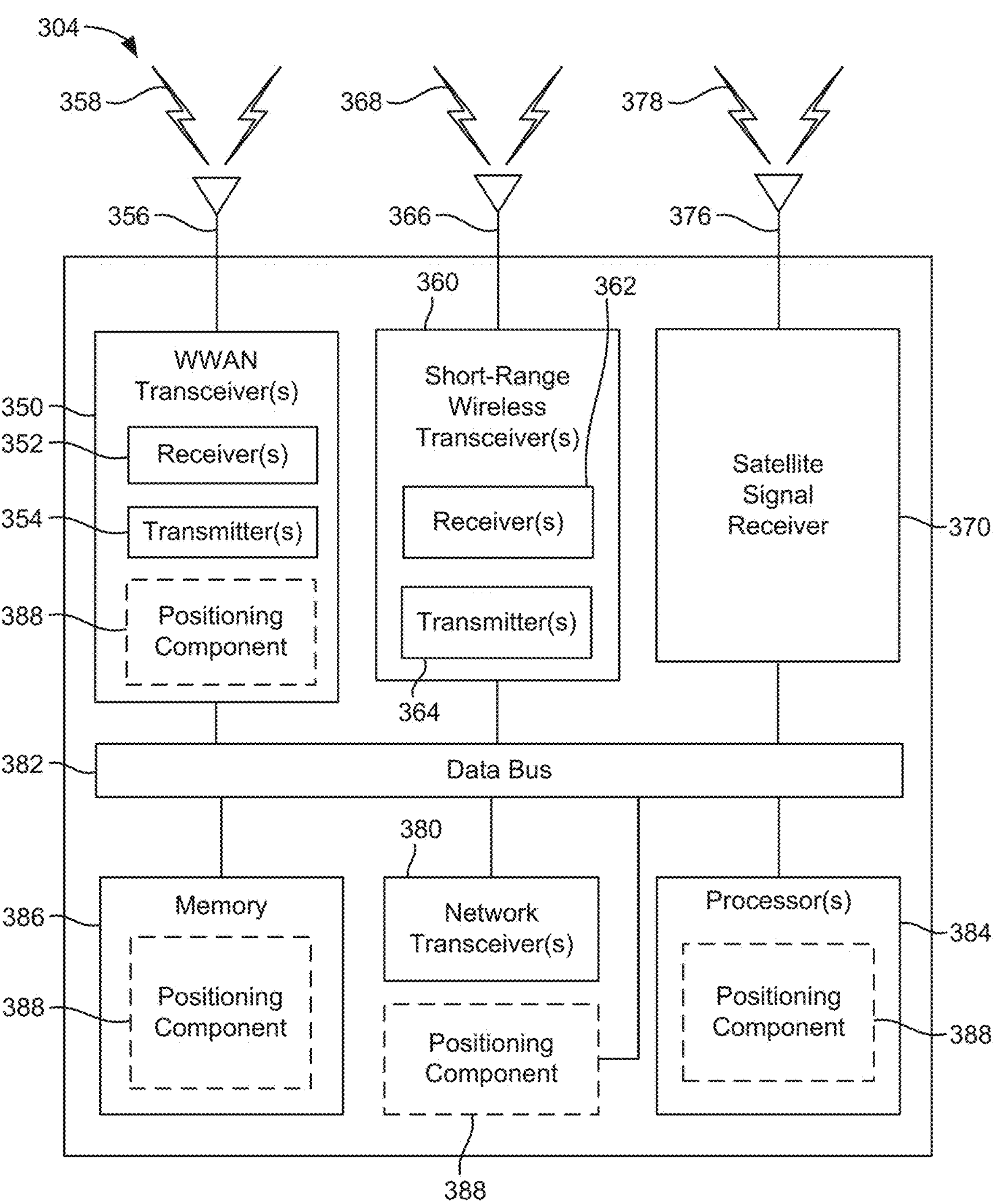
Figure 3C:
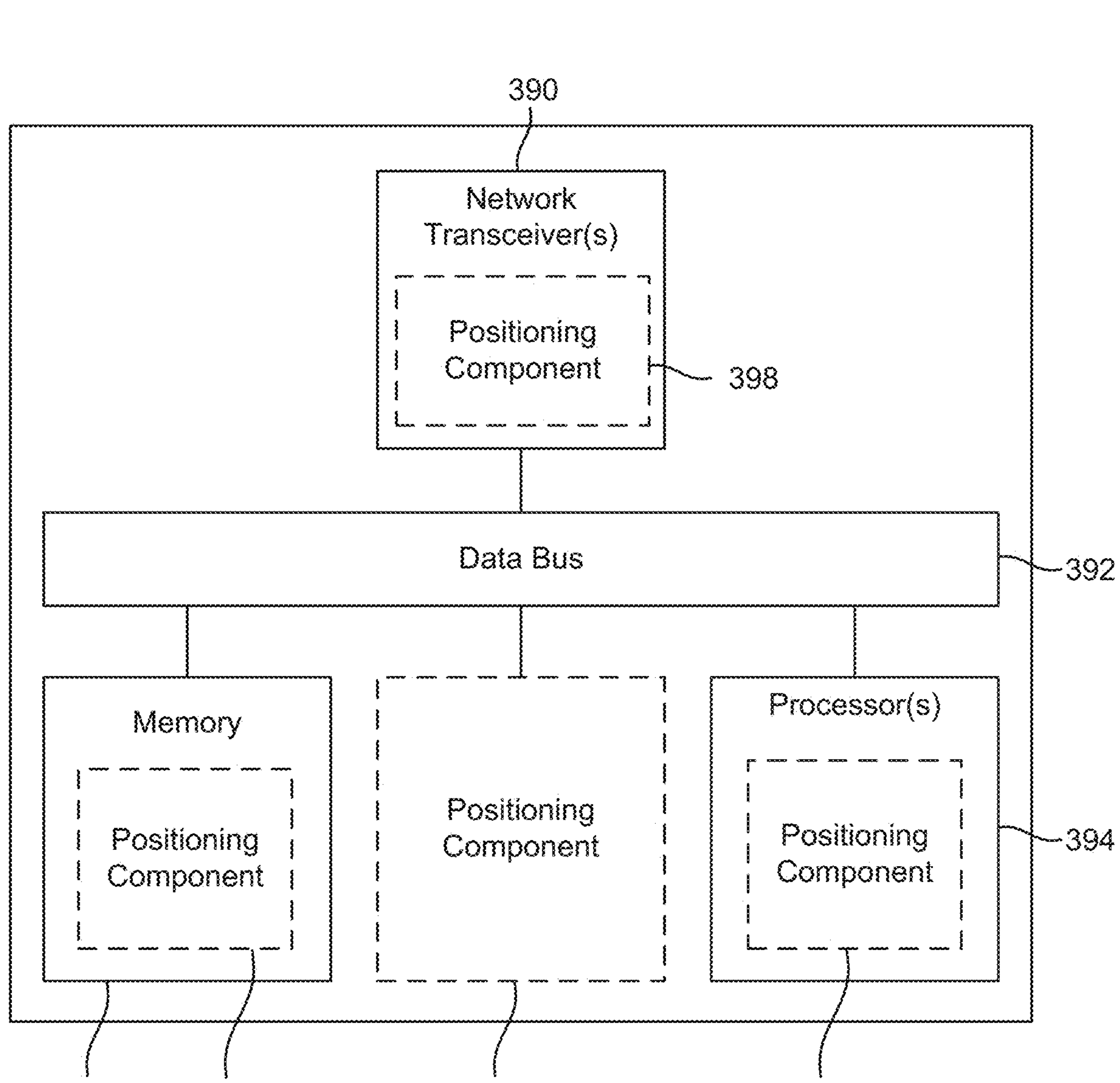

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the operations described herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., Wi-Fi, LTE Direct, BLUETOOTH®, ZIGBEE®, Z-WAVE®, PC5, dedicated short-range communications (DSRC), wireless access for vehicular environments (WAVE), near-field communication (NFC), ultra-wideband (UWB), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be Wi-Fi transceivers, BLUETOOTH® transceivers, ZIGBEE® and/or Z-WAVE® transceivers, NFC transceivers, UWB transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS®) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning component 342, 388, and 398, respectively. The positioning component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning component 342, 388, and 398 may be external to the processors 332, 384, and 394 (e.g., part of a modem processing system, integrated with another processing system, etc.). Alternatively, the positioning component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the one or more WWAN transceivers 310, the memory 340, the one or more processors 332, or any combination thereof, or may be a standalone component. FIG. 3B illustrates possible locations of the positioning component 388, which may be, for example, part of the one or more WWAN transceivers 350, the memory 386, the one or more processors 384, or any combination thereof, or may be a standalone component. FIG. 3C illustrates possible locations of the positioning component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging. RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the downlink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or personal computer (PC) or laptop may have Wi-Fi and/or BLUETOOTH® capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite signal receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as Wi-Fi).

Figure 4:
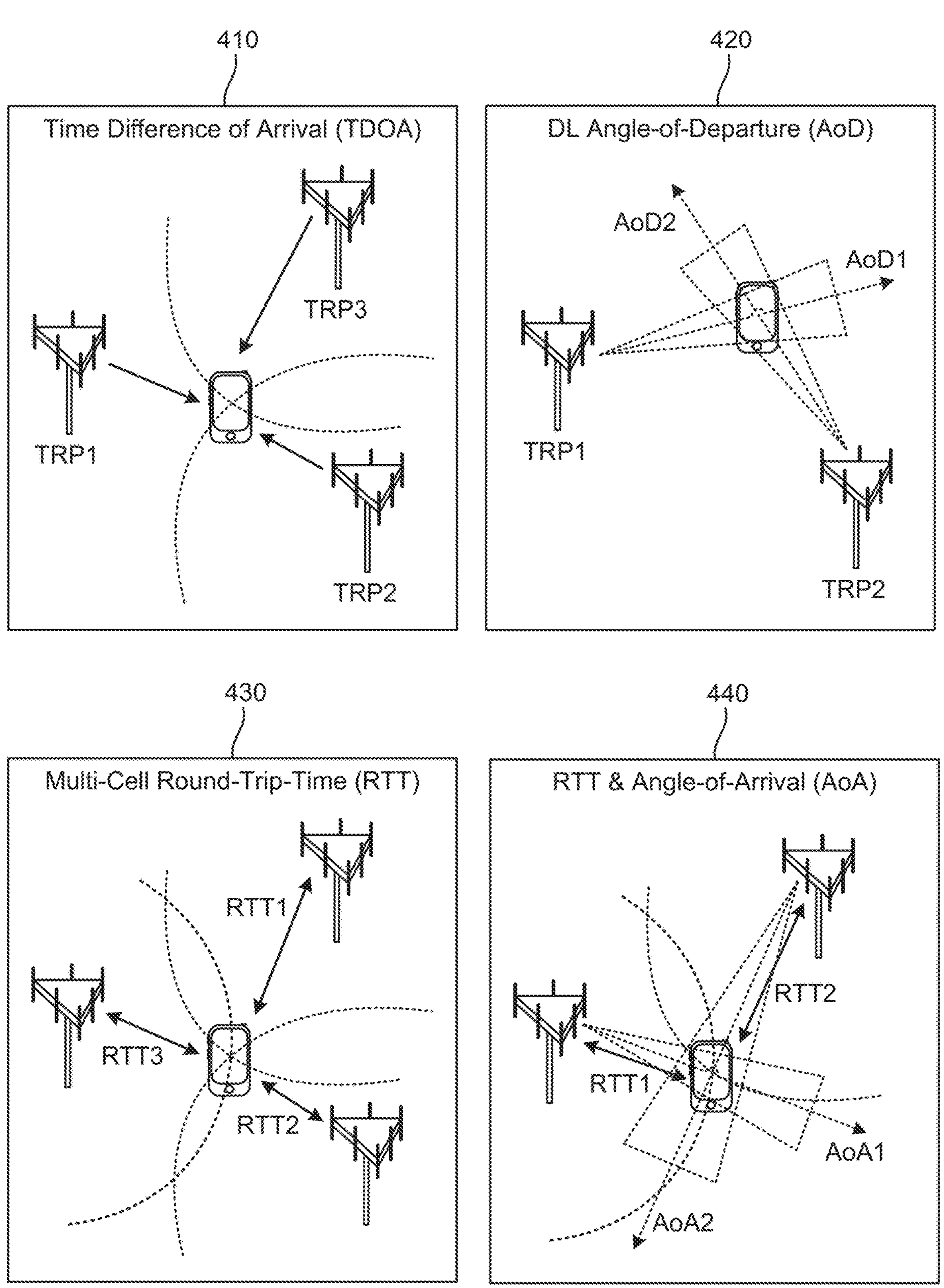
FIG. 4 illustrates examples of various positioning methods supported in New Radio (NR), according to aspects of the disclosure.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. FIG. 4 illustrates examples of various positioning methods, according to aspects of the disclosure. An OTDOA or DL-TDOA positioning procedure, illustrated by scenario 410, makes use of the downlink reference signal time difference (DL-RSTD), and optionally DL-PRS-RSRP and/or DL-PRS reference signal received path power (DL-PRS-RSRPP), or downlink signals (e.g., DL-PRS) received from multiple TRPs. The UE measures the DL-RSTD (and optionally DL-PRS-RSRP and/or DL-PRS-RSRPP) of the received signals using assistance data received from the location server, and the resulting measurements are used along with other configuration information to locate the UE in relation to the neighboring TRPs.

A DL-RSTD measurement is the downlink relative timing difference between a TRP j and a reference TRP i, denoted T_SubframeRxj−T_SubframeRxi, where T_SubframeRxj is the time when the UE receives the start of one subframe from TRP j, and T_SubframeRxi is the time when the UE receives the corresponding start of one subframe from TRP i that is closes in time to the subframe received from TRP j. Multiple DL-PRS resources can be used to determine the start of one subframe from a TRP. For FR1, the reference point for a DL-RSTD measurement is the antenna connector of the UE, and for FR2, the reference point for a DL-RSTD measurement is the antenna of the UE.

For DL-AoD positioning, illustrated by scenario 420, the UE position is estimated based on DL-PRS-RSRP and/or DL-PRS-RSRPP measurements taken at the UE of downlink radio signals (e.g., PRS) from multiple NR TRPs, along with knowledge of the spatial information of the downlink radio signals and geographic coordinates of the TRPs. The positioning entity uses the DL-PRS-RSRP and/or DL-PRS-RSRPP measurements of multiple TRPs to determine the angle(s) between the UE and the TRPs. The positioning entity can then estimate the location of the UE based on the spatial information (angles) of the downlink radio signals and the known location(s) of the TRPs. The UE, while connected to a gNB, may require measurement gaps to perform the DL-AoD measurements. The UE may request measurement gaps from a gNB, and may also request to activate pre-configured measurement gaps.

The DL-PRS-RSRP measurement is defined as the linear average over the power contributions of the resource elements that carry DL-PRS configured for RSRP measurements within the considered measurement frequency bandwidth. For FR1, the reference point for the DL-PRS-RSRP is the antenna connector of the UE. For FR2, DL-PRS-RSRP is measured based on the combined signal from antenna elements corresponding to a given receiver branch. For FR1 and FR2, if receiver diversity is in use by the UE, the reported DL-PRS-RSRP value is not lower than the corresponding DL-PRS-RSRP of any of the individual receiver branches.

The DL-PRS-RSRPP measurement is defined as the power of the linear average of the channel response at the i-th path delay of the resource elements that carry DL-PRS configured for the measurement, where DL-PRS-RSRPP for the first path delay is the power contribution corresponding to the first detected path in time. For FR1, the reference point for the DL-PRS-RSRPP is the antenna connector of the UE. For FR2, DL-PRS-RSRPP is measured based on the combined signal from antenna elements corresponding to a given receiver branch. For FR1 and FR2, if receiver diversity is in use by the UE for DL-PRS-RSRPP measurements, the reported DL-PRS-RSRPP value included in the higher layer parameter "NR-DL-AoD-MeasElement" for the first and additional measurements is provided for the same receiver branch(es) as applied for DL-PRS-RSRP measurements.

Uplink-based positioning methods include uplink time difference of arrival (UL-TDOA) and uplink angle-of-arrival (UL-AoA). The UL-TDOA positioning method makes use of the uplink relative time of arrival (UL-RTOA) (and optionally SRS-RSRP and/or SRS-RSRPP) at multiple TRPs of uplink signals (e.g., SRS) transmitted by a UE. The TRPs measure the UL-RTOA (and optionally SRS-RSRP and/or SRS-RSRPP) of the received signals using assistance data received from the location server, and the resulting measurements are used along with other configuration information to estimate the location of the UE.

In order to obtain uplink measurements, the TRPs need to know the characteristics of the SRS transmitted by the UE for the time period required to perform uplink measurement. These characteristics should be static over the periodic transmission of SRS during the uplink measurements. Hence, the location server indicates to the serving gNB the need to direct the UE to transmit SRS for uplink positioning. It is up to the serving gNB to make the final decision on the resources to be assigned and to communicate this SRS configuration information back to the location server so that the location server can forward the SRS configuration to the other TRPs. The gNB may decide (e.g., in case no resources are available) to configure no resources for the UE and report the empty resource configuration to the LMF.

The UL-RTOA measurement is defined as the beginning of subframe i containing SRS received at a TRP j, relative to the RTOA reference time. The UL-RTOA reference time is defined as $T_0+t_{SRS}$, where $T_0$ is the nominal beginning time of subframe number (SFN) 0 provided by SFN Initialization Time, and $t_{SRS}=(10n_f+n_{sf})\times 10^{-3}$, where $n_f$ and $n_{sf}$ are the system frame number and the subframe number of the SRS, respectively. Multiple SRS resources can be used to determine the beginning of one subframe containing SRS received at a TRP. The reference point for an UL-RTOA measurement may be the receive antenna connector, the receive antenna (i.e. the center location of the radiating region of the receive antenna), or the receive transceiver array boundary connector, depending on the type of the base station.

The UL-AoA positioning method makes use of the measured azimuth angle of arrival (A-AoA) and zenith angle of arrival (Z-AoA) at multiple TRPs of uplink signals transmitted from a UE. The TRPs measure A-AoA and Z-AoA (and optionally UL-SRS-RSRPP) of the received signals using assistance data received from the location server, and the resulting measurements are used along with other configuration information to estimate the location of the UE.

In order to obtain uplink measurements, the TRPs need to know the characteristics of the SRS signal transmitted by the UE for the time period required to calculate uplink measurement. These characteristics should be static over the periodic transmission of SRS during the uplink measurements. Hence, the location server will indicate to the serving gNB the need to direct the UE to transmit SRS signals for uplink positioning. It is up to the gNB to make the final decision on resources to be assigned and to communicate this configuration information back to the location so that the location server can configure the TRPs. The gNB may decide (e.g., in case no resources are available) to configure no resources for the UE and fail the corresponding New Radio positioning protocol type A (NRPPa) procedure.

The SRS-RSRPP measurement is defined as the power of the linear average of the channel response at the i-th path delay of the resource elements that carry the received SRS configured for the measurement, where the SRS-RSRPP for the first path delay is the power contribution corresponding to the first detected path in time. The reference point for SRS-RSRPP may be the receive antenna connector, based on the combined signal from antenna elements corresponding to a given receiver branch, or the receive transceiver array boundary connector, depending on the type of the base station. For FR1 and FR2, if receiver diversity is in use by the gNB for SRS-RSRPP measurements, the reported SRS-RSRPP value for the first and additional paths is provided for the same receiver branch(es) as applied for RS-RSRP measurements, or the reported SRS-RSRPP value for the first path is not lower than the corresponding SRS-RSRPP for the first path of any of the individual receiver branches and the reported SRS-RSRPP for the additional paths is provided for the same receiver branch(es) as applied SRS-RSRPP for the first path.

The SRS-RSRP measurement is defined as the linear average of the power contributions of the resource elements carrying SRS. SRS-RSRP is measured over the configured resource elements within the considered measurement frequency bandwidth in the configured measurement time occasions. The reference point for UL SRS-RSRP may be the receive antenna connector, based on the combined signal from antenna elements corresponding to a given receiver branch, or the receive transceiver array boundary connector, depending on the type of the base station. For FR1 and FR2, if receiver diversity is in use by the gNB, the reported SRS-RSRP value is not lower than the corresponding SRS-RSRP of any of the individual receiver branches.

The UL-AoA measurement is defined as the estimated azimuth angle (A-AoA) and vertical angle (Z-AoA) of a UE with respect to a reference direction. The reference direction may be defined in the global coordinate system (GCS), where the estimated azimuth angle is measured relative to geographical North and is positive in a counter-clockwise direction, and the estimated vertical angle is measured relative to zenith and positive to the horizontal direction. Alternatively, or additionally, the reference direction may be defined in a local coordinate system (LCS), where the estimated azimuth angle is measured relative to the x-axis of the LCS and positive in a counter-clockwise direction, and the estimated vertical angle is measured relative to the z-axis of the LCS and positive to the x-y plane direction. The UL-AoA is determined at the gNB antenna for an uplink channel (e.g., SRS) corresponding to the UE.

Downlink-and-uplink-based positioning methods include enhanced cell-ID (E-CID) positioning and multi-round-trip-time (RTT) positioning (also referred to as "multi-cell RTT" and "multi-RTT"). In an RTT procedure, a first entity (e.g., a base station or a UE) transmits a first RTT-related signal (e.g., a PRS or SRS) to a second entity (e.g., a UE or base station), which transmits a second RTT-related signal (e.g., an SRS or PRS) back to the first entity. Each entity measures the time difference between the time of arrival (ToA) of the received RTT-related signal and the transmission time of the transmitted RTT-related signal. This time difference is referred to as a reception-to-transmission (Rx-Tx) time difference. The Rx-Tx time difference measurement may be made, or may be adjusted, to include only a time difference between nearest slot boundaries for the received and transmitted signals. Both entities may then send their Rx-Tx time difference measurement to a location server (e.g., an LMF 270), which calculates the round trip propagation time (i.e., RTT) between the two entities from the two Rx-Tx time difference measurements (e.g., as the sum of the two Rx-Tx time difference measurements). Alternatively, one entity may send its Rx-Tx time difference measurement to the other entity, which then calculates the RTT. The distance between the two entities can be determined from the RTT and the known signal speed (e.g., the speed of light). For multi-RTT positioning, illustrated by scenario 430, a first entity (e.g., a UE or base station) performs an RTT positioning procedure with multiple second entities (e.g., multiple base stations or UEs) to enable the location of the first entity to be determined (e.g., using multilateration) based on distances to, and the known locations of, the second entities. RTT and multi-RTT methods can be combined with other positioning techniques, such as UL-AoA and DL-AoD, to improve location accuracy, as illustrated by scenario 440.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive slots including PRS, periodicity of the consecutive slots including PRS, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (μs). In some cases, when any of the resources used for the positioning measurement are in FR1, the value range for the uncertainty of the expected RSTD may be +/−32 μs. In other cases, when all of the resources used for the positioning measurement(s) are in FR2, the value range for the uncertainty of the expected RSTD may be +/−8 μs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Long-Term Evolution (LTE) positioning protocol (LPP) is used point-to-point between a location server (e.g., LMF 270) and a target device (e.g., a UE) in order to position the target device using position-related measurements obtained by one or more reference sources (physical entities or parts of physical entities that provide signals that can be measured by a target device in order to obtain the location of the target device). An LPP session is used between a location server and a target device in order to obtain location-related measurements or a location estimate or to transfer assistance data. Currently, a single LPP session is used to support a single location request and multiple LPP sessions can be used between the same endpoints to support multiple different location requests. Each LPP session comprises one or more LPP transactions (or procedures), with each LPP transaction performing a single operation (capability exchange, assistance data transfer, or location information transfer). Each LPP transaction involves the exchange of one or more LPP messages between the location server and the target device. The general format of an LPP message consists of a set of common fields followed by a body. The body (which may be empty) contains information specific to a particular message type. Each message type contains information specific to one or more positioning methods and/or information common to all positioning methods.

An LPP session generally includes at least a capability transfer or indication procedure, an assistance data transfer or delivery procedure, and a location information transfer or delivery procedure. FIG. 5 illustrates an example LPP capability transfer procedure 510, LPP assistance data transfer procedure 530, and LPP location information transfer procedure 550 between a target device (labeled "Target") and a location server (labeled "Server"), according to aspects of the disclosure.

The purpose of an LPP capability transfer procedure 510 is to enable the transfer of capabilities from the target device (e.g., a UE 204) to the location server (e.g., an LMF 270). Capabilities in this context refer to positioning and protocol capabilities related to LPP and the positioning methods supported by LPP. In the LPP capability transfer procedure 510, the location server (e.g., an LMF 270) indicates the types of capabilities needed from the target device (e.g., UE 204) in an LPP Request Capabilities message. The target device responds with an LPP Provide Capabilities message. The capabilities included in the LPP Provide Capabilities message should correspond to any capability types specified in the LPP Request Capabilities message. Specifically, for each positioning method for which a request for capabilities is included in the LPP Request Capabilities message, if the target device supports this positioning method, the target device includes the capabilities of the target device for that supported positioning method in the LPP Provide Capabilities message. For an LPP capability indication procedure, the target device provides unsolicited (i.e., without receiving an LPP Request Capabilities message) capabilities to the location server in an LPP Provide Capabilities message.

The purpose of an LPP assistance data transfer procedure 530 is to enable the target device to request assistance data from the location server to assist in positioning, and to enable the location server to transfer assistance data to the target device in the absence of a request. In the LPP assistance data transfer procedure 530, the target device sends an LPP Request Assistance Data message to the location server. The location server responds to the target device with an LPP Provide Assistance Data message containing assistance data. The transferred assistance data should match or be a subset of the assistance data requested in the LPP Request Assistance Data. The location server may also provide any not requested information that it considers useful to the target device. The location server may also transmit one or more additional LPP Provide Assistance Data messages to the target device containing further assistance data. For an LPP assistance data delivery procedure, the location server provides unsolicited assistance data necessary for positioning. The assistance data may be provided periodically or non-periodically.

The purpose of an LPP location information transfer procedure 550 is to enable the location server to request location measurement data and/or a location estimate from the target device, and to enable the target device to transfer location measurement data and/or a location estimate to a location server in the absence of a request. In an LPP location information transfer procedure 550, the location server sends an LPP Request Location Information message to the target device to request location information, indicating the type of location information needed and potentially the associated QoS. The target device responds with an LPP Provide Location Information message to the location server to transfer location information. The location information transferred should match or be a subset of the location information requested by the LPP Request Location Information unless the location server explicitly allows additional location information. More specifically, if the requested information is compatible with the target device's capabilities and configuration, the target device includes the requested information in an LPP Provide Location Information message. Otherwise, if the target device does not support one or more of the requested positioning methods, the target device continues to process the message as if it contained only information for the supported positioning methods and handles the signaling content of the unsupported positioning methods by LPP error detection. If requested by the LPP Request Lactation Information message, the target device sends additional LPP Provide Location Information messages to the location server to transfer additional location information. An LPP location information delivery procedure supports the delivery of positioning estimations based on unsolicited service.

LPP also defines procedures related to error indication for when a receiving endpoint (target device or location server) receives erroneous or unexpected data or detects that certain data are missing. Specifically, when a receiving endpoint determines that a received LPP message contains an error, it can return an Error message to the transmitting endpoint indicating the error or errors and discard the received/erroneous message. If the receiving endpoint is able to determine that the erroneous LPP message is an LPP Error or Abort Message, then the receiving endpoint discards the received message without returning an Error message to the transmitting endpoint.

LPP also defines procedures related to abort indication to allow a target device or location server to abort an ongoing procedure due to some unexpected event (e.g., cancellation of a location request by an LCS client). An Abort procedure can also be used to stop an ongoing procedure (e.g., periodic location reporting from the target device). In an Abort procedure, a first endpoint determines that procedure P must be aborted and sends an Abort message to a second endpoint carrying the transaction ID for procedure P. The second endpoint then aborts procedure P.

As noted above, a UE may measure PRS transmitted by one or more TRPs. A "PRS resource" is a collection of resource elements (REs) that are used for transmission of PRS. The collection of resource elements can span multiple physical resource blocks (PRBs) in the frequency domain and 'N' (such as 1 or more) consecutive symbol(s) within a slot in the time domain. In a given orthogonal frequency division multiplexing (OFDM) symbol in the time domain, a PRS resource occupies consecutive PRBs in the frequency domain.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as "PRS-ResourceRepetitionFactor") across slots. The periodicity is the time from the first repetition of the first PRS resource of a first PRS instance to the same first repetition of the same first PRS resource of the next PRS instance. The periodicity may have a length selected from $2^{\mu}$*{4, 5, 8, 10, 16, 20, 32, 40, 64, 80, 160, 320, 640, 1280, 2560, 5120, 10240} slots, with u=0, 1, 2, 3. The repetition factor may have a length selected from {1, 2, 4, 6, 8, 16, 32} slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance, a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing and cyclic prefix (CP) type (meaning all numerologies supported for the physical downlink shared channel (PDSCH) are also supported for PRS), the same Point A, the same value of the downlink PRS bandwidth, the same start PRB (and center frequency), and the same comb-size. The Point A parameter takes the value of the parameter "ARFCN-ValueNR" (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

Figure 6:
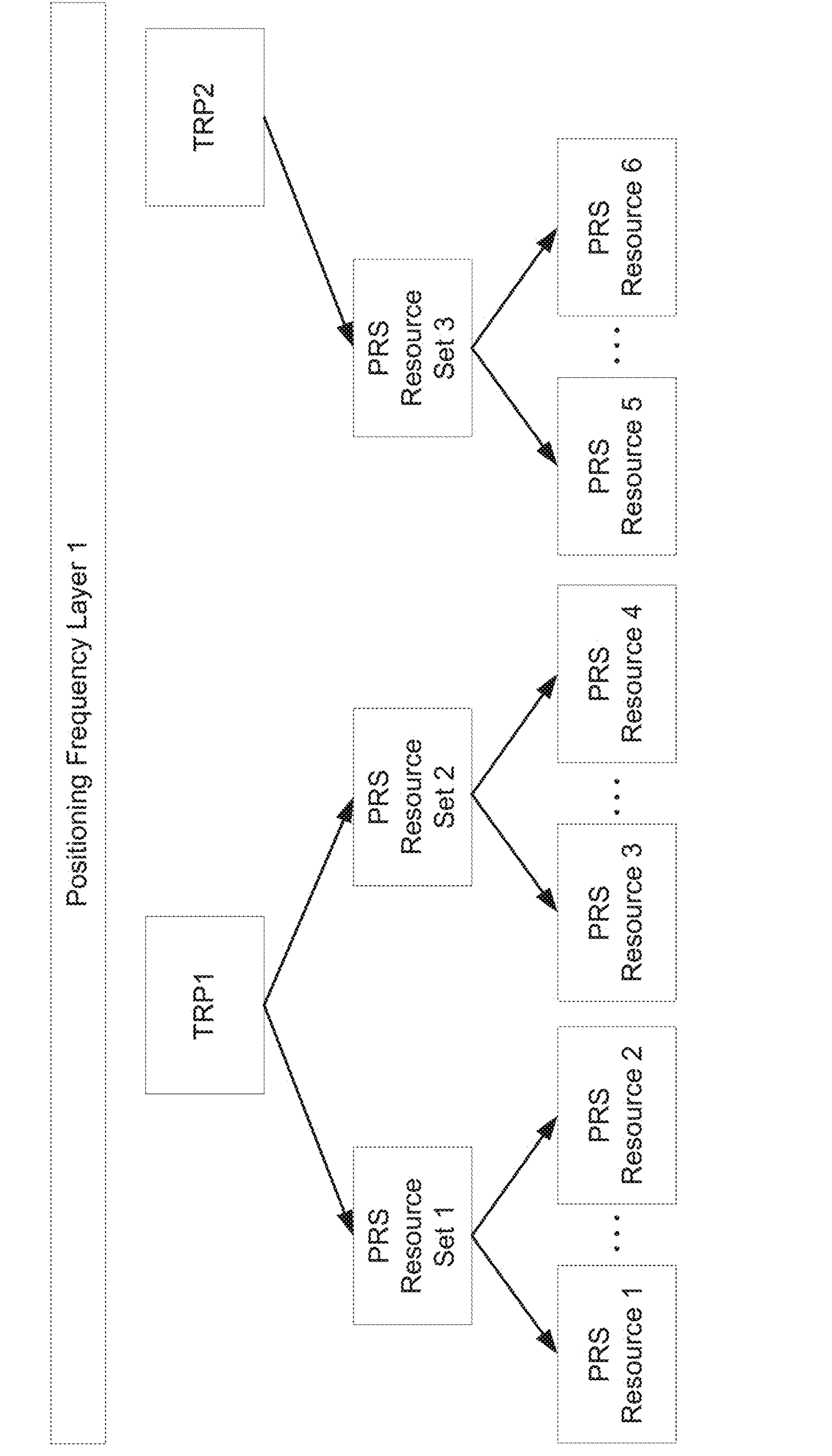
FIG. 6 is a diagram illustrating an example downlink positioning reference signal (DL-PRS) configuration for two transmission-reception points (TRPs) operating in the same positioning frequency layer, according to aspects of the disclosure.

FIG. 6 is a diagram 600 illustrating an example PRS configuration for two TRPs (labeled "TRP1" and "TRP2") operating in the same positioning frequency layer (labeled "Positioning Frequency Layer 1"), according to aspects of the disclosure. For a positioning session, a UE may be provided with assistance data indicating the illustrated PRS configuration. In the example of FIG. 6, the first TRP ("TRP1") is associated with (e.g., transmits) two PRS resource sets, labeled "PRS Resource Set 1" and "PRS Resource Set 2," and the second TRP ("TRP2") is associated with one PRS resource set, labeled "PRS Resource Set 3." Each PRS resource set comprises at least two PRS resources. Specifically, the first PRS resource set ("PRS Resource Set 1") includes PRS resources labeled "PRS Resource 1" and "PRS Resource 2," the second PRS resource set ("PRS Resource Set 2") includes PRS resources labeled "PRS Resource 3" and "PRS Resource 4," and the third PRS resource set ("PRS Resource Set 3") includes PRS resources labeled "PRS Resource 5" and "PRS Resource 6."

When a UE is configured in the assistance data of a positioning method with a number of PRS resources beyond its capability, the UE assumes the PRS resources in the assistance data are sorted in a decreasing order of measurement priority. Currently, the 64 TRPs per frequency layer are sorted according to priority and the two PRS resource sets per TRP of the frequency layer are sorted according to priority. However, the four frequency layers may or may not be sorted according to priority, and the 64 PRS resources of the PRS resource set per TRP per frequency layer may or may not be sorted according to priority. The reference indicated by the assistance data parameter "nr-DL-PRS-ReferenceInfo" for each frequency layer has the highest priority, at least for DL-TDOA positioning procedures.

As also noted above, a UE may transmit SRS to be measured by one or more TRPs. SRS transmitted by a UE may be used by a base station to obtain the channel state information (CSI) for the transmitting UE. CSI describes how an RF signal propagates from the UE to the base station and represents the combined effect of scattering, fading, and power decay with distance. The system uses the SRS for resource scheduling, link adaptation, massive MIMO, beam management, etc.

A collection of REs that are used for transmission of SRS is referred to as an "SRS resource," and may be identified by the parameter "SRS-ResourceId." The collection of resource elements can span multiple PRBs in the frequency domain and 'N' (e.g., one or more) consecutive symbol(s) within a slot in the time domain. In a given OFDM symbol, an SRS resource occupies one or more consecutive PRBs. An "SRS resource set" is a set of SRS resources used for the transmission of SRS signals, and is identified by an SRS resource set ID ("SRS-ResourceSetId").

The transmission of SRS resources within a given PRB has a particular comb size (also referred to as the "comb density"). A comb size 'N' represents the subcarrier spacing (or frequency/tone spacing) within each symbol of an SRS resource configuration. Specifically, for a comb size 'N,' SRS are transmitted in every Nth subcarrier of a symbol of a PRB. For example, for comb-4, for each symbol of the SRS resource configuration, REs corresponding to every fourth subcarrier (such as subcarriers 0, 4, 8) are used to transmit SRS of the SRS resource.

Currently, an SRS resource may span 1, 2, 4, 8, or 12 consecutive symbols within a slot with a comb size of comb-2, comb-4, or comb-8. The following are the frequency offsets from symbol to symbol for the SRS comb patterns that are currently supported. 1-symbol comb-2: {0}; 2-symbol comb-2: {0, 1}; 2-symbol comb-4: {0, 2}; 4-symbol comb-2: {0, 1, 0, 1}; 4-symbol comb-4: {0, 2, 1, 3}; 8-symbol comb-4: {0, 2, 1, 3, 0, 2, 1, 3}; 12-symbol comb-4: {0, 2, 1, 3, 0, 2, 1, 3, 0, 2, 1, 3}; 4-symbol comb-8: {0, 4, 2, 6}; 8-symbol comb-8: {0, 4, 2, 6, 1, 5, 3, 7}; and 12-symbol comb-8: {0, 4, 2, 6, 1, 5, 3, 7, 0, 4, 2, 6}.

Generally, as noted above, a UE transmits SRS to enable the receiving base station (either the serving base station or a neighboring base station) to measure the channel quality (i.e., CSI) between the UE and the base station. However, SRS can also be specifically configured as uplink positioning reference signals for uplink-based positioning procedures, such as UL-TDOA, RTT, UL-AoA, etc. As used herein, the term "SRS" may refer to SRS configured for channel quality measurements or SRS configured for positioning purposes. The former may be referred to herein as "SRS-for-communication" and/or the latter may be referred to as "SRS-for-positioning" or "positioning SRS" when needed to distinguish the two types of SRS.

Several enhancements over the previous definition of SRS may be available for SRS-for-positioning (also referred to as "UL-PRS"), such as a new staggered pattern within an SRS resource (except for single-symbol/comb-2), a new comb type for SRS, new sequences for SRS, a higher number of SRS resource sets per component carrier, and a higher number of SRS resources per component carrier. In addition, the parameters "SpatialRelationInfo" and "PathLossReference" are to be configured based on a downlink reference signal or SSB from a neighboring TRP. Further still, one SRS resource may be transmitted outside the active BWP, and one SRS resource may span across multiple component carriers. Also, SRS may be configured in RRC connected state and only transmitted within an active BWP. Further, there may be no frequency hopping, no repetition factor, a single antenna port, and new lengths for SRS (e.g., 8 and 12 symbols). There also may be open-loop power control and not closed-loop power control, and comb-8 (i.e., an SRS transmitted every eighth subcarrier in the same symbol) may be used. Lastly, the UE may transmit through the same transmit beam from multiple SRS resources for UL-AoA. These features may be configured through RRC higher layer signaling (and potentially triggered or activated through a MAC control element (MAC-CE) or downlink control information (DCI)).

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), SSBs, SRS, UL-PRS, etc. In addition, the terms "positioning reference signal" and "PRS" may refer to downlink, uplink, or sidelink positioning reference signals, unless otherwise indicated by the context. If needed to further distinguish the type of PRS, a downlink positioning reference signal may be referred to as a "DL-PRS," an uplink positioning reference signal (e.g., an SRS-for-positioning, PTRS) may be referred to as an "UL-PRS," and a sidelink positioning reference signal may be referred to as an "SL-PRS." In addition, for signals that may be transmitted in the downlink, uplink, and/or sidelink (e.g., DMRS), the signals may be prepended with "DL," "UL," or "SL" to distinguish the direction. For example, "UL-DMRS" is different from "DL-DMRS."

Figure 7:
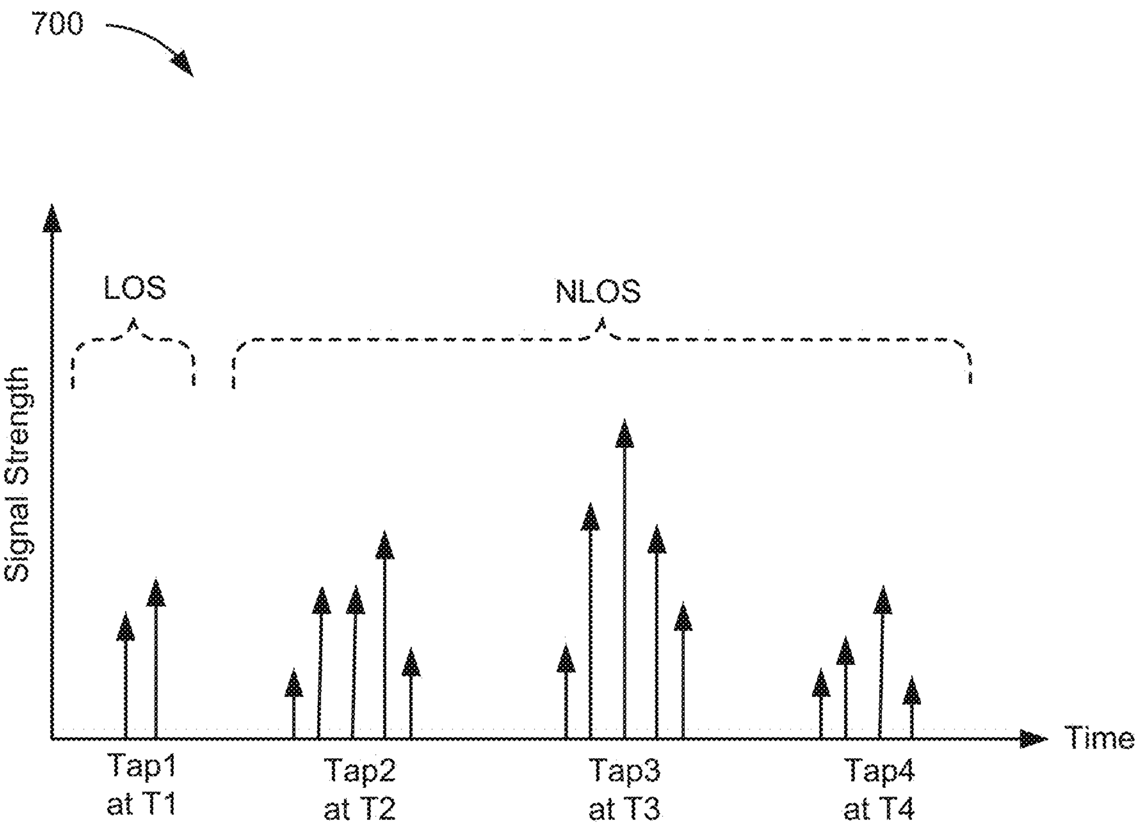
FIG. 7 is a graph representing a radio frequency (RF) channel impulse response over time, according to aspects of the disclosure.

FIG. 7 is a graph 700 representing an example channel estimate of a multipath channel between a receiver device (e.g., any of the UEs or base stations described herein) and a transmitter device (e.g., any other of the UEs or base stations described herein), according to aspects of the disclosure. The channel estimate represents the intensity of a radio frequency (RF) signal (e.g., a positioning reference signal (PRS)) received through a multipath channel as a function of time delay, and may be referred to as the channel energy response (CER), channel frequency response (CFR), channel impulse response (CIR), delay profile (DP), or power delay profile (PDP) of the channel. Thus, the horizontal axis represents time (e.g., milliseconds) and the vertical axis represents signal strength (e.g., decibels). Note that a multipath channel is a channel between a transmitter and a receiver over which an RF signal follows multiple paths, or multipaths, due to transmission of the RF signal on multiple beams and/or to the propagation characteristics of the RF signal (e.g., reflection, refraction, etc.).

In the example of FIG. 7, the receiver detects/measures multiple (four) channel taps of the RF signal. Each channel tap is a cluster of one or more rays and corresponds to a multipath that the RF signal followed between the transmitter and the receiver. Thus, a channel tap represents the time of arrival and signal strength of an RF signal over a multipath. There may be multiple channel taps due to the RF signal being transmitted on different transmit beams (and therefore at different angles), or because of the propagation characteristics of RF signals (e.g., potentially following different paths due to reflections), or both. Note that although FIG. 7 illustrates channel taps of two to five rays, as will be appreciated, the channel taps may have more or fewer than the illustrated number of rays.

In the example of FIG. 7, the channel tap detected at time T3 is composed of stronger rays than the channel tap detected at time T1. This may be due to an obstruction on the line-of-sight (LOS) path between the transmitter and the receiver. Alternatively or additionally, there may be a strong reflector along the non-line-of-sight (NLOS) path corresponding to the channel tap detected at time T3.

Machine learning may be used to generate models that may be used to facilitate various aspects associated with processing of data. One specific application of machine learning relates to generation of measurement models for processing of reference signals for positioning (e.g., PRS), such as feature extraction, reporting of reference signal measurements (e.g., selecting which extracted features to report), and so on.

Machine learning models are generally categorized as either supervised or unsupervised. A supervised model may further be sub-categorized as either a regression or classification model. Supervised learning involves learning a function that maps an input to an output based on example input-output pairs. For example, given a training dataset with two variables of age (input) and height (output), a supervised learning model could be generated to predict the height of a person based on their age. In regression models, the output is continuous. One example of a regression model is a linear regression, which simply attempts to find a line that best fits the data. Extensions of linear regression include multiple linear regression (e.g., finding a plane of best fit) and polynomial regression (e.g., finding a curve of best fit).

Another example of a machine learning model is a decision tree model. In a decision tree model, a tree structure is defined with a plurality of nodes. Decisions are used to move from a root node at the top of the decision tree to a leaf node at the bottom of the decision tree (i.e., a node with no further child nodes). Generally, a higher number of nodes in the decision tree model is correlated with higher decision accuracy.

Another example of a machine learning model is a decision forest. Random forests are an ensemble learning technique that builds off of decision trees. Random forests involve creating multiple decision trees using bootstrapped datasets of the original data and randomly selecting a subset of variables at each step of the decision tree. The model then selects the mode of all of the predictions of each decision tree. By relying on a "majority wins" model, the risk of error from an individual tree is reduced.

Another example of a machine learning model is a neural network (NN). A neural network is essentially a network of mathematical equations. Neural networks accept one or more input variables, and by going through a network of equations, result in one or more output variables. Put another way, a neural network takes in a vector of inputs and returns a vector of outputs.

Figure 8:
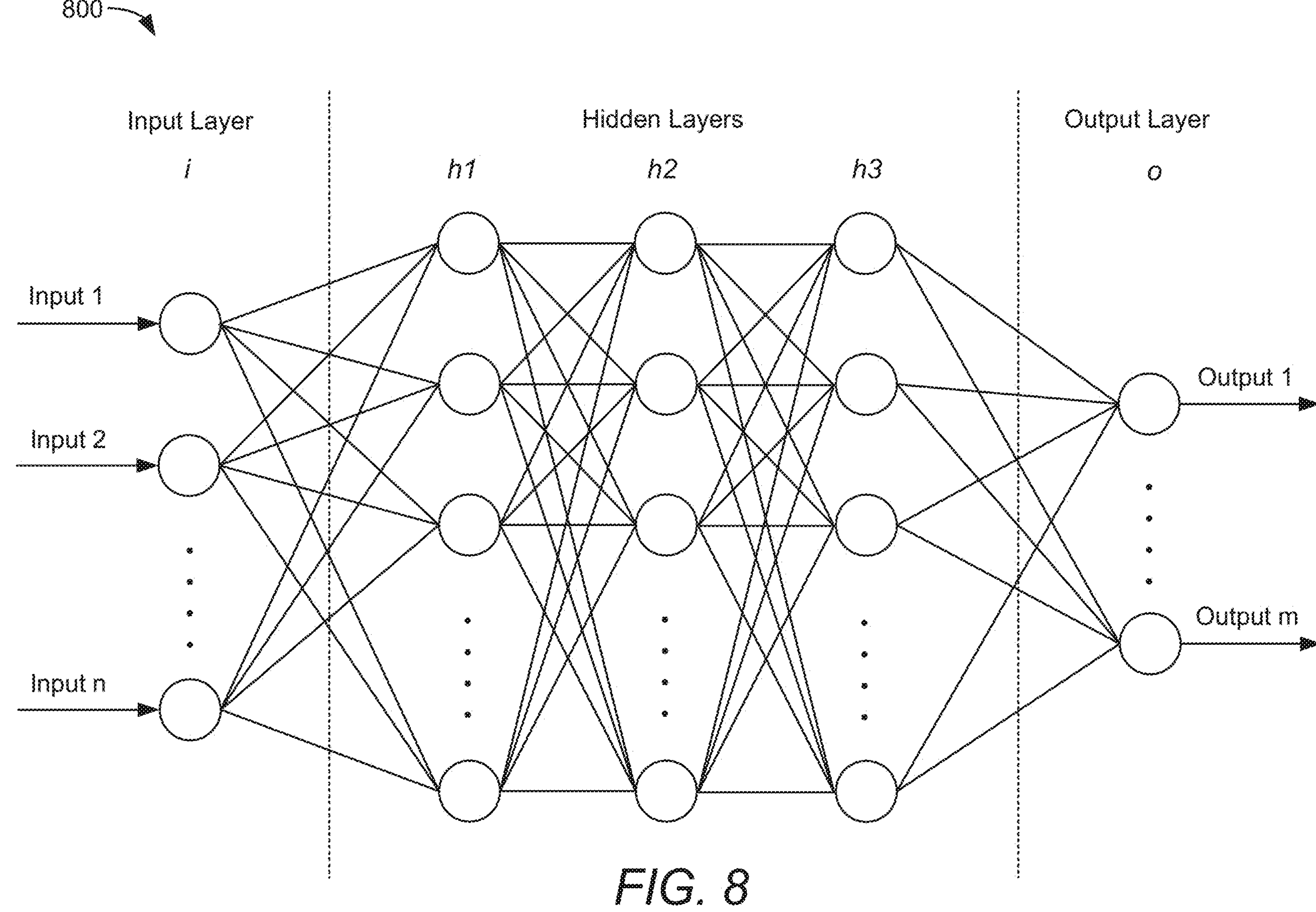
FIG. 8 illustrates an example neural network, according to aspects of the disclosure.

FIG. 8 illustrates an example neural network 800, according to aspects of the disclosure. The neural network 800 includes an input layer 'i' that receives 'n' (one or more) inputs (illustrated as "Input 1," "Input 2," and "Input n"), one or more hidden layers (illustrated as hidden layers 'h1,' 'h2,' and 'h3') for processing the inputs from the input layer, and an output layer 'o' that provides 'm' (one or more) outputs (labeled "Output 1" and "Output m"). The number of inputs 'n,' hidden layers 'h,' and outputs 'm' may be the same or different. In some designs, the hidden layers 'h' may include linear function(s) and/or activation function(s) that the nodes (illustrated as circles) of each successive hidden layer process from the nodes of the previous hidden layer.

In classification models, the output is discrete. One example of a classification model is logistic regression. Logistic regression is similar to linear regression but is used to model the probability of a finite number of outcomes, typically two. In essence, a logistic equation is created in such a way that the output values can only be between '0' and '1.' Another example of a classification model is a support vector machine. For example, for two classes of data, a support vector machine will find a hyperplane or a boundary between the two classes of data that maximizes the margin between the two classes. There are many planes that can separate the two classes, but only one plane can maximize the margin or distance between the classes. Another example of a classification model is Naïve Bayes, which is based on Bayes Theorem. Other examples of classification models include decision tree, random forest, and neural network, similar to the examples described above except that the output is discrete rather than continuous.

Unlike supervised learning, unsupervised learning is used to draw inferences and find patterns from input data without references to labeled outcomes. Two examples of unsupervised learning models include clustering and dimensionality reduction.

Clustering is an unsupervised technique that involves the grouping, or clustering, of data points. Clustering is frequently used for customer segmentation, fraud detection, and document classification. Common clustering techniques include k-means clustering, hierarchical clustering, mean shift clustering, and density-based clustering. Dimensionality reduction is the process of reducing the number of random variables under consideration by obtaining a set of principal variables. In simpler terms, dimensionality reduction is the process of reducing the dimension of a feature set (in even simpler terms, reducing the number of features). Most dimensionality reduction techniques can be categorized as either feature elimination or feature extraction. One example of dimensionality reduction is called principal component analysis (PCA). In the simplest sense, PCA involves project higher dimensional data (e.g., three dimensions) to a smaller space (e.g., two dimensions). This results in a lower dimension of data (e.g., two dimensions instead of three dimensions) while keeping all original variables in the model.

Regardless of which machine learning model is used, at a high-level, a machine learning module (e.g., implemented by a processing system, such as processors 332, 384, or 394) may be configured to iteratively analyze training input data (e.g., measurements of reference signals to/from various target UEs) and to associate this training input data with an output data set (e.g., a set of possible or likely candidate locations of the various target UEs), thereby enabling later determination of the same output data set when presented with similar input data (e.g., from other target UEs at the same or similar location).

As noted above, the DL-TDOA positioning method relies on determining the RSTD measurement between pairs of TRPs and the UE to locate the UE. For UE-assisted DL-TDOA positioning, the UE measures DL-RSTDs and reports them to the location server (e.g., LMF 207), which utilizes the reported DL-RSTD measurements and knowledge of the TRPs' locations to position the UE. For UE-based DL-TDOA positioning, the location server provides the UE with TRP location information, and the UE measures the RSTDs and computes its position based on solving the TDOA equations. The UE can report its estimated position to the location server.

The NR DL-TDoA positioning framework currently depends on the instantaneous DL-PRS RSTD measurements and does not consider the future predictions of these measurements (e.g., using artificial intelligence/machine learning (AI/ML) techniques) to enhance positioning estimates. However, AI/ML can be used to produce accurate predictions for future DL-PRS RSTD measurements.

There are various benefits to reporting/indicating predicted future DL-PRS RSTD measurements. For example, future DL-PRS RSTD measurements can be used to enhance instantaneous DL-TDOA positioning by applying smoothing-like techniques (e.g., Kalman smoothing), which improves accuracy. As another example benefit, predicted future DL-PRS RSTD measurements can be obtained while using sparse PRS resources, which reduces PRS resource overhead. Currently, reporting or signaling (e.g., via LPP) predicted future DL-PRS RSTD measurements that are predicted by a UE-side AI/ML prediction model is not supported.

The present disclosure provides techniques for UE-sided prediction of DL-PRS RSTD (and optionally RSTD per path) measurements using a UE-sided AI/ML prediction model. As a first technique, LPP signaling can be extended to support UE reporting of predicted future DL-PRS RSTD (and optionally RSTD per path) measurements, referred to as UE-assisted DL-TDOA positioning with UE-side RSTD prediction. In this case, the location server (e.g., LMF 270) can leverage the predicted DL-PRS RSTD (and optionally RSTD per path) measurements to compute predicted future UE locations using the DL-TDOA positioning method. The location server can apply Kalman smoothing to enhance the current UE location by leveraging predicted future DL-PRS RSTD (and optionally RSTD per path) measurement estimations.

As a second technique, referred to as UE-based DL-TDOA positioning with UE-side RSTD prediction, the UE can report a predicted future UE location that is predicted by the UE using DL-TDOA positioning. The UE can leverage this future prediction to enhance the current UE location (e.g., using Kalman smoothing). The present disclosure provides capability messaging, assistance data, and location information reporting to support these two techniques.

Kalman smoothing (KS) can be applied to mimic a non-causal Kalman filtering while accounting for both past and predicted "future" measurements (also referred to as future predictions). If predictions of future measurements are available (e.g., by prediction), then they can be used to backpropagate and enhance "current" measurement estimation (like in Kalman filtering but applied in a reverse manner, i.e., from future back to the present). Kalman smoothing considers both forward and backward prediction to enhance current measurement estimation.

FIG. 9 is a diagram 900 illustrating an example of RSTD temporal prediction, according to aspects of the disclosure. As shown in FIG. 9, given a sequence of M previous RF fingerprints (RFFPs) (e.g., CIRs, CFRs, PDPs, DPs, etc.) and/or RSTD/ToA/RSRP/RSRPP measurements denoted "c," the AI/ML RSTD temporal prediction model can predict N future RSTD measurements (and optionally RSTD per path measurements). The AI/ML RSTD temporal prediction model may be implemented at the UE.

FIG. 10 illustrates example artificial intelligence/machine learning (AI/ML) positioning scenarios with a UE-side AI/ML model, according to aspects of the disclosure. Specifically, diagram 1000 illustrates an example of UE-based positioning with UE-side prediction, and diagram 1050 illustrates an example of UE-assisted positioning with UE-side prediction.

Referring to the technique of UE-based DL-TDOA positioning with UE-side RSTD prediction described herein, this technique may be applied where the UE has the capability to compute current locations and predict future locations based on DL-TDoA positioning with RSTD AI/ML prediction. In this case, referring to FIG. 10, at stage 1, the location server (e.g., LMF 270) provides DL-TDOA assistance data, including the locations and PRS configurations of the TRPs to be measured, to the UE. At stage 2, the TRPs transmit, and the UE obtains RSTD (and optionally RSTD per path) measurements of, the configured PRS resources. At stage 3, the UE predicts future RSTD (and optionally RSTD per path)

measurements and computes its current and predicted future locations. That is, the predicted future RSTDs are estimates/predictions of what the RSTD values of the measured PRS resources would be at the UE at some future point in time (e.g., at some future repetition/occasion of the PRS resources). The UE can also compute an enhanced current location estimate by applying Kalman smoothing to the obtained measurements. At stage 4, the UE reports, to the location server, its current target location (based on DL-TDOA positioning techniques) and the future target location (based on DL-TDOA positioning techniques).

Referring to the technique of UE-assisted DL-TDOA positioning with UE-side RSTD prediction described herein, this technique may be applied where the UE has lower capabilities for computing a DL-TDOA-based position estimate, but is capable of predicting future RSTDs using an AI/ML RSTD temporal prediction model. In this case, referring to FIG. 10, at stage 1, the location server (e.g., LMF 270) provides DL-TDOA assistance data to the UE, including the locations and PRS configurations of the TRPs to be measured. At stage 2, the TRPs transmit, and the UE obtains RSTD (and optionally RSTD per path) measurements of, the configured PRS resources. At stage 3, the UE predicts future RSTD (and optionally RSTD per path) measurements. At stage 4, the UE reports, to the location server, the current RSTD (and optionally RSTD per path) measurements and the predicted future RSTD (and optionally RSTD per path) measurements. At stage 5, the location server calculates the current and future UE locations using DL-TDOA positioning techniques. The location server can also compute an enhanced current location estimation by applying Kalman smoothing to the received measurements.

From the perspective of a target device (e.g., a UE) in greater detail, the target device receives a first set of reference signals (e.g., PRS resources) transmitted by a first set of network nodes (e.g., NG-RAN nodes, such as ng-eNBs, gNBs, TRPs, etc.), measures the RSTDs (and optionally RSTD per path) of the reference signals (optionally along with other measurements), inputs them into an AI/ML model, and obtains predictions of RSTDs (and optionally RSTD per path) of a future second set of reference signals that may be transmitted by the first set of network nodes. That is, the predicted future RSTD is an estimate/prediction of what the RSTD value of the measured PRS resources would be at the UE at some future point in time (e.g., at some future repetition/occasion of the PRS resources). The target device may then report the measured RSTDs along with the future predictions to a network entity (e.g., LMF 270).

In an aspect, the other measurements may be CIRs, CFRs, PDPs, DPs, or other channel estimates of the reference signals. In an aspect, the target device may also compute its locations using the RSTDs (e.g., using a TDOA-based positioning algorithm). The target device may also compute its predicted future locations using the predicted RSTDs (e.g., using a TDOA positioning algorithm). In an aspect, the target device may report its current and predicted future locations to the network entity. The target device may also receive, from the network entity, instructions to activate/deactivate the computation and reporting of future measurement/location predictions. In an aspect, the foregoing requests/responses can be exchanged as part of an LPP Location Information Transfer Procedure 550 for DL-TDOA positioning.

In an aspect, the target device may send, to the network entity, its capabilities to predict future RSTDs (and optionally RSTD per path), as well as future location predictions. The capabilities may provide further information on whether the target device can apply Kalman smoothing to enhance current location estimates or current RSTDs (and optionally RSTD per path). The capabilities may provide further information on whether the target device can accept the AI/ML model from the network. The capabilities may also indicate how far into the future (e.g., seconds, minutes, etc.) the target device can predict RSTDs (and optionally RSTD per path) and/or locations, as well as any required measurement gaps and/or processing requirements. In an aspect, the target device may receive a request, from the network entity, to send its capabilities. In an aspect, the foregoing capability aspects can be exchanged as part of an LPP Capability Transfer Procedure 510 for a DL-TDOA positioning procedure.

In an aspect, the target device may receive, from the network entity, assistance data that configures the reporting of current and future RSTDs (and optionally RSTD per path) and/or locations, along with reference signal configurations. The assistance data may also include information on obtaining the AI/ML model. The assistance data may also configure the periodicity and quantity of reporting (e.g., individual/bulk reporting). The assistance data may also configure the target device to apply Kalman smoothing for enhancing the current location and/or RSTD (and optionally RSTD per path) measurements. In an aspect, the foregoing assistance data aspects may be part of an LPP Assistance Data Transfer Procedure 530 for a DL-TDOA positioning procedure.

From the perspective of a network entity (e.g., LMF 270) in greater detail, the network entity may request a target device (e.g., a UE) to indicate its capabilities to predict future RSTD measurements using an AI/ML model, and receives from the target device a list of capabilities. The network entity may also send, to the target device, assistance data regarding the prediction of future RSTD (and optionally RSTD per path) measurements, and receive, from the target device, a report of the measured RSTDs (and optionally RSTD per path), along with their future predictions. The network entity may also receive, from the target device, estimated current and predicted future locations that are obtained using the current and predicted RSTD (and optionally RSTD per path) measurements, respectively. The network entity may send, to the target device, instructions to activate/deactivate the computation and reporting of future measurement/location predictions. In an aspect, the above requests/responses can be sent as part of an LPP Location Information Transfer Procedure 550 for a DL-TDOA positioning procedure.

In an aspect, the target device may provide capabilities to the network entity indicating whether the target device can apply Kalman smoothing to enhance the current location estimates or current RSTDs (and optionally RSTD per path). The capabilities may further indicate whether the target device can accept an AI/ML model from the network. The capabilities may also indicate how far into the future the target device can predict RSTDs (and optionally RSTD per path) and/or location estimates, and any required measurement gaps and/or processing requirements. In an aspect, the network entity may receive the capabilities from the target device without sending a request for the capabilities. In an aspect, the foregoing capabilities aspects may be part of an LPP Capability Transfer Procedure 510 for a DL-TDOA positioning procedure.

In an aspect, the assistance data may configure the reporting of current and future RSTDs (and optionally RSTD per path) and/or locations, along with the reference signal configurations. The assistance data may also include information regarding obtaining the AI/ML model. The assistance data may also configure the target device to apply Kalman smoothing for enhancing current RSTD (and optionally RSTD per path) measurements and/or location estimates. The assistance data may also configure the periodicity and quantity of reporting (e.g., individual/bulk reporting). In an aspect, the foregoing assistance data aspects may be part of an LPP Assistance Data Transfer Procedure 530 for a DL-TDOA positioning procedure.

As noted above, the DL-AoD positioning method relies on determining the best downlink beams and angles (i.e., AoDs) between multiple TRPs and a UE to position the UE. For UE-assisted DL-AoD positioning, the UE measures DL-PRS-RSRPs/RSRPPs and reports them to the location server (e.g., LMF 270). The location server utilizes the reported DL-PRS-RSRP/RSRPP measurements and knowledge of the DL-PRS beam angle to position the UE. For UE-based DL-AoD positioning, the location server provides the UE with DL-PRS angle information, the UE measures the DL-PRS-RSRPs/RSRPPs, determines the best DL-AoD angle(s), and computes its position based on the DL-AoD measurements. The UE may also report its estimated position to the location server.

Like the NR DL-TDoA positioning framework, the NR DL-AoD positioning framework currently depends on the instantaneous DL-PRS-RSRP/RSRPP measurements and does not consider the future predictions of these measurements (e.g., using AI/ML) to enhance positioning estimates. AI/ML techniques can be used to produce accurate predictions for future DL-PRS-RSRP/RSRPP measurements (e.g., based on UE trajectory and history of movement).

It would be beneficial to enable reporting of future DL-PRS RSRP/RSRPP measurements for various reasons. For example, predicted future DL-PRS-RSRP/RSRPP measurements (and implicitly future DL-AoD angles) can be used to enhance instantaneous DL-AoD positioning by applying smoothing-like techniques (e.g., Kalman smoothing), resulting in improved accuracy. As another example, predicted future DL-PRS-RSRP/RSRPP measurements (and implicitly future DL-AoD angles) can be obtained while using sparse PRS resources, thereby reducing PRS resource overhead.

Currently. LPP does not support reporting or signaling future DL-PRS-RSRP/RSRPP predictions that are predicted by a UE-sided AI/ML prediction model. Accordingly, the present disclosure provides techniques for UE-sided prediction of future PRS resource RSRP/RSRPP measurements using a UE-sided AI/ML prediction model. As a first technique, referred to as UE-based DL-AoD positioning with UE-side PRS resource/beam RSRP/RSRPP prediction, the LPP specification can be extended to support a UE reporting predictions of future UE location that are predicted at the UE side. The UE can also leverage this future prediction to enhance the current UE location.

As a second technique, referred to as UE-assisted DL-AoD positioning with UE-side PRS beam RSRP/RSRPP prediction, the LPP specification can be extended to support UE reporting of predicted future PRS RSRP/RSRPP measurements. The location server can then leverage these predicted future PRS RSRP/RSRPP estimates to compute future UE locations using the DL-AoD positioning method. The location server can also leverage these predicted future PRS RSRP/RSRPP estimates and/or future UE locations to enhance positioning of the current UE location (e.g., using Kalman smoothing). The present disclosure provides capability messaging, assistance data, and reporting configurations to support these two techniques.

Figure 11:
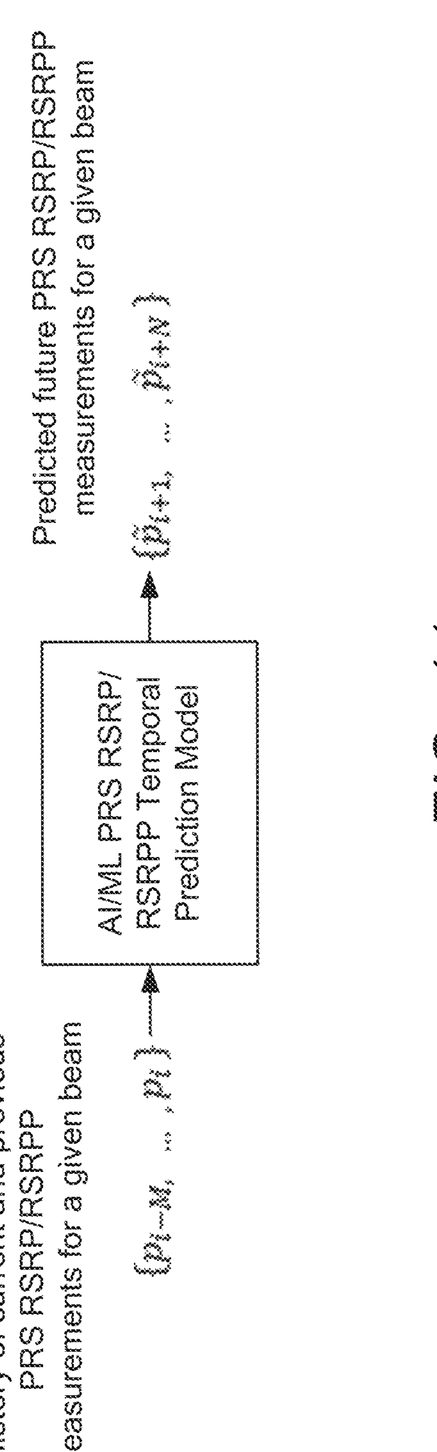
FIG. 11 is a diagram illustrating an example of positioning reference signal reference signal received power/reference signal received path power (PRS RSRP/RSRPP) temporal prediction, according to aspects of the disclosure.

FIG. 11 is a diagram 1100 illustrating an example of PRS RSRP/RSRPP temporal prediction, according to aspects of the disclosure. As shown in FIG. 11, given a sequence of M previous PRS RSRP/RSRPP measurements (denoted "p"), the AI/ML PRS RSRP/RSRPP temporal prediction model can predict N future PRS RSRP/RSRPP measurements. The model input can also include other RFFPs (e.g., CIRs, CFRs, PDPs, DPs, etc.). The model input can also include measurements from multiple TRPs/beams (i.e., multi-TRP model input construction). The AI/ML PRS RSRP/RSRPP temporal prediction model may be implemented at the UE.

Referring to the technique of UE-based DL-AoD positioning with UE-side PRS beam RSRP/RSRPP prediction described herein in greater detail, this technique is applicable to UEs that have the capability to compute current locations and predict future locations based on DL-AoD positioning with PRS RSRP/RSRPP AI/ML prediction. In this case, referring back to FIG. 10, at stage 1, the location server (e.g., LMF 270) provides DL-AoD assistance data to the UE, including the locations of the TRPs to be measured and the angles of the beams on which the PRS resources to be measured are transmitted. At stage 2, the TRPs transmit, and the UE obtains PRS RSRP/RSRPP measurements of, the configured PRS resources. At stage 3, the UE predicts future PRS RSRP/RSRPP measurements and computes its current and predicted future locations. That is, the predicted future PRS RSRP/RSRPP measurements are estimates/predictions of what the PRS RSRP/RSRPP values of the measured PRS resources would be at the UE at some future point in time (e.g., at some future repetition/occasion of the PRS resources). The UE can also compute an enhanced current location estimate by applying Kalman smoothing to the obtained measurements. At stage 4, the UE reports, to the location server, its current target location (based on DL-AoD positioning techniques) and the predicted future target location (based on DL-AoD positioning techniques).

Referring to the technique of UE-assisted DL-AoD positioning with UE-based PRS beam RSRP/RSRPP prediction described herein, this technique may be applied where the UE has lower capabilities for computing a DL-AoD-based position estimate, but is capable of predicting future PRS RSRP/RSRPP measurements using an AI/ML PRS RSRP/RSRPP temporal prediction model. In this case, referring back to FIG. 10, at stage 1, the location server (e.g., LMF 270) provides DL-AoD assistance data to the UE, including the locations of the TRPs to be measured and, optionally, the angles of the beams on which the PRS resources to be measured are transmitted. At stage 2, the TRPs transmit, and the UE obtains PRS RSRP/RSRPP measurements of, the configured PRS resources. At stage 3, the UE predicts future PRS RSRP/RSRPP measurements using an AI/ML PRS RSRP/RSRPP temporal prediction model. At stage 4, the UE reports, to the location server, the current PRS RSRP/RSRPP measurements and the predicted future PRS RSRP/RSRPP measurements. At stage 5, the location server calculates the current and predicted future UE locations based on DL-AoD positioning techniques. The location server can also compute an enhanced current location estimate by applying Kalman smoothing to the received measurements.

From the perspective of a target device (e.g., a UE) in greater detail, the target device may indicate to a network entity (e.g., LMF 270) its capability to implement UE-based DL-AoD positioning with UE-side PRS beam RSRP/RSRPP prediction and/or UE-assisted DL-AoD positioning with UE-side PRS beam RSRP/RSRPP prediction. The capability message can also indicate the number of predictions the target device can support for each technique. The capability message can also indicate whether the target device needs any measurement gaps or processing gaps to enable prediction and reporting for each technique. The capability message can also indicate target device capabilities to conduct Kalman smoothing. The capability message can also indicate whether the target device can accept an AI/ML prediction model that is generated by the network for the above techniques. The capability message can also indicate whether the target device has a proprietary AI/ML prediction model for the above techniques. The network entity may request, and the target device may provide, the foregoing capabilities. The foregoing capability aspects may be included as part of an LPP Capability Transfer Procedure 510 for a DL-AoD positioning procedure.

In an aspect, the target device may receive assistance data from the network entity (e.g., LMF 270) that helps the target device to predict future PRS RSRP/RSRPP measurements and derive predictions for a future target device location. The assistance data may include existing PRS assistance for DL-AoD positioning. The assistance data may also include the configurations for PRS resources that are not transmitted and need to be predicted by the target device (i.e., the target device does not need to measure these resources and can leverage prediction to determine their measurements and derive a predicted location based on them).

The assistance data may further configure the target device with respect to various reporting aspects. As a first type of reporting, the assistance data may configure the target device for individual reporting of current and future PRS RSRP/RSRPP measurements and/or the target device's location. As a second type of reporting, the assistance data may configure the target device for bulk reporting of current and future PRS RSRP/RSRPP measurements and/or the target device's location. The assistance data may further indicate the periodicity of reporting the measurements/location. The target device may request, and the network entity may provide, the foregoing assistance data. The assistance data may be requested and included as part of an LPP Assistance Data Transfer Procedure for a DL-DoA positioning procedure.

With continued reference to the actions of the target device, the target device receives PRS resources and obtains measurements and predictions using an AI/ML PRS RSRP/RSRPP prediction model. The target device may compute its current location using DL-AoD positioning. The target device may compute its predicted future location(s) using predicted future measurements from the AI/ML model. The target device may apply Kalman smoothing to previous and future estimates of PRS RSRP/RSRPP and/or target device locations to enhance the current target device location estimate.

In the case of UE-based DL-AoD positioning with UE-side PRS beam RSRP/RSRPP prediction, the target device may report, to the location server, the current and predicted future target device locations as configured. The target device may also report a soft value of these predicted locations (e.g., a quality of the location estimates/predictions). In the case of UE-assisted DL-AoD positioning with UE-side PRS beam RSRP/RSRPP prediction, the target device may report, to the network entity, the current and predicted future PRS RSRP/RSRPP measurements as configured. The target device may also report a soft-value of the reported PRS RSRP/RSRPP values (e.g., quality of measurements/predictions).

With continued reference to UE-assisted DL-AoD positioning with UE-side PRS beam RSRP/RSRPP prediction, the network entity may compute the current target device location using the reported measurement quantities based on DL-AoD positioning techniques. The location server may also compute the predicted future target device location(s) using the reported measurement quantities based on DL-AoD positioning techniques. The network entity may also apply Kalman smoothing to previous and future estimates of PRS RSRP/RSRPP, reported by the target device, to enhance the current target device location estimate. The foregoing signaling can be included as part of an LPP Location Information Transfer Procedure 550 for a DL-AoD positioning procedure.

The UL-AoA positioning method relies on determining the best uplink beams and angles (AoAs) between multiple TRPs and a UE to position the UE. The involved NG-RAN nodes (e.g., gNBs/TRPs) measure SRS-RSRPs/RSRPPs and the associated AoAa and report them to the location server (e.g., LMF 270). The location server utilizes the reported SRS-RSRP/RSRPP measurements to position the UE.

The NR UL-AoA positioning framework currently depends on the instantaneous SRS-RSRP/RSRPP/AoA measurements and does not consider the future predictions of these measurements (e.g., using AI/ML) to enhance positioning estimates. However, AI/ML can be used to produce accurate predictions of future SRS-RSRP/RSRPP/AoA measurements (e.g., based on UE trajectory and history of movement).

There are various advantages for NRPPa to enable reporting/indicating of predicted future SRS-RSRP/RSRPP/AoA measurements. For example, predicted future SRS-RSRP/RSRPP/AoA measurements can be obtained while using sparse SRS resources, thereby reducing SRS resource overhead and reducing UE power consumption (i.e., power saving). As another example, the predicted future SRS-RSRP/RSRPP/AoA measurements can be used to enhance instantaneous estimates of UL-AoA positioning by applying smoothing-like techniques (e.g., Kalman smoothing), thereby improving accuracy. However, NRPPa does not currently support the reporting or signaling of future SRS beam RSRP/RSRPP predictions that are predicted by a gNB/TRP-sided AI/ML prediction model.

Accordingly, the present disclosure provides techniques to enable a TRP/gNB to predict future SRS beam RSRP/RSRPP/AoA measurements using an AI/ML prediction model. The NRPPa specification may be extended to support NG-RAN node reporting future predictions of SRS RSRP/RSRPP/AoA measurements. To enhance current positioning, the location server can leverage the reported predicted future SRS-RSRP/RSRPP/A0A measurements and/or predicted future UE location(s) to enhance positioning of the current UE location (e.g., using Kalman smoothing). To reduce resource overhead and improve UE power savings, the location server can leverage the future RSRP/RSRPP/AoA measurement predictions to compute future UE locations using UL-AoA positioning. The present disclosure therefore proposes capability messaging, assistance data, and reporting configuration to support NG-RAN-assisted UL-AoA positioning with NG-RAN-based SRS beam RSRP/RSRPP/AoA prediction.

FIG. 12 is a diagram 1200 illustrating an example of SRS RSRP/RSRPP/AoA temporal prediction, according to aspects of the disclosure. As shown in FIG. 12, given a sequence of M previous SRS RSRP/RSRPP measurements (or other SRS-based RFFP measurements) an AI/ML SRS beam RSRP/RSRPP temporal prediction model can predict N future SRS RSRP/RSRPP measurements. Similarly, given a sequence of M previous SRS UL-AoA measurements (or other SRS-based RFFP measurements) an AI/ML UL-AoA temporal prediction model can predict N future UL-AoA measurements.

Figure 13:
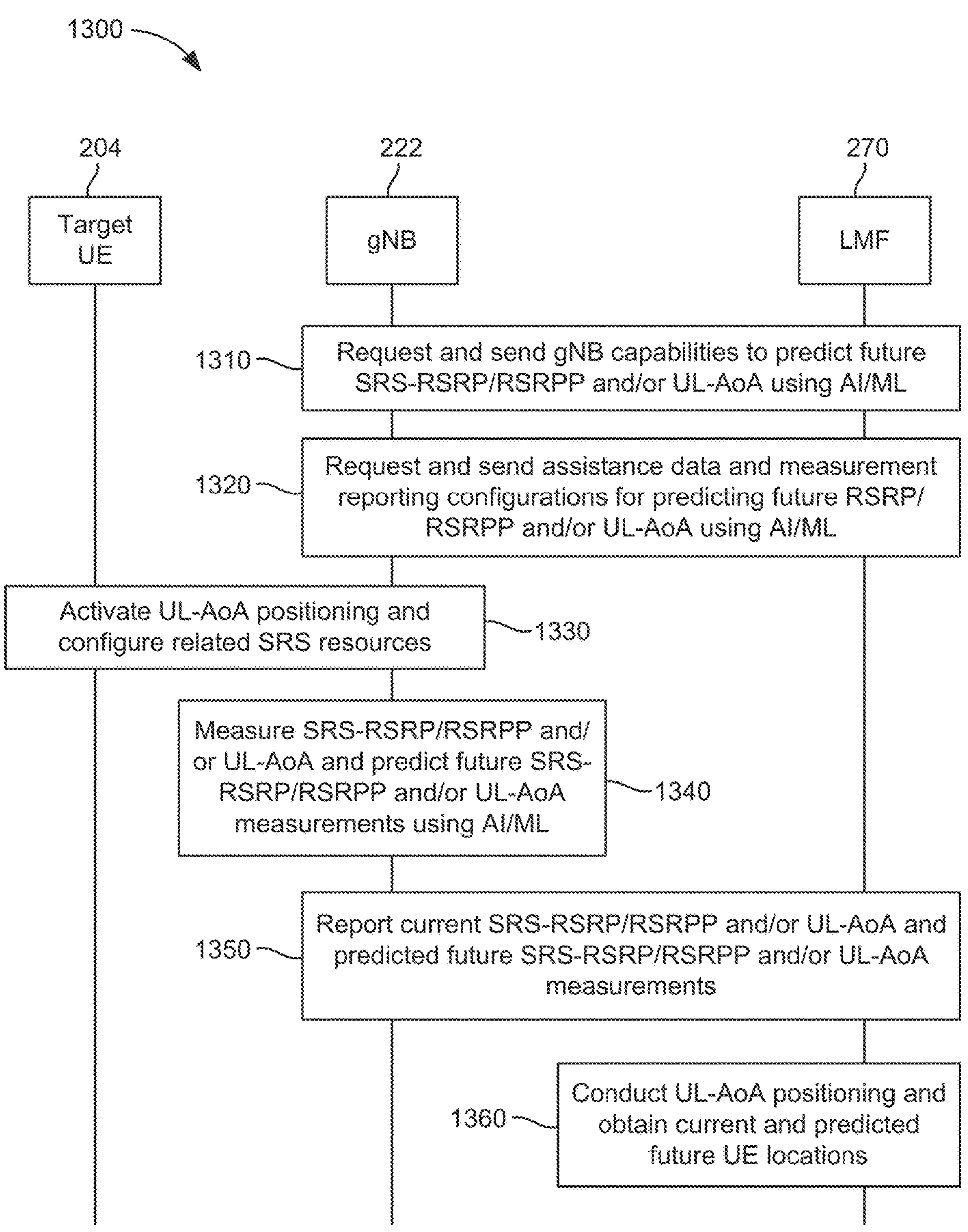
FIG. 13 is a diagram illustrating an example call flow for base station prediction of future SRS beam RSRP/RSRPP/AoA measurements using an AI/ML prediction model, according to aspects of the disclosure.

FIG. 13 is a diagram 1300 illustrating an example call flow for gNB prediction of future SRS beam RSRP/RSRPP/AoA measurements using an AI/ML prediction model, according to aspects of the disclosure.

At stage 1310, an LMF 270 (or other location server) requests, and a gNB 222 (or other NG-RAN node) provides, capabilities of the gNB 222 to predict future SRS-RSRP/RSRPP and/or UL-AoA measurements using AI/ML (i.e., using an AI/ML model). The requested and provided capabilities may also include capabilities of the gNB 222 to apply Kalman smoothing to the current measurements.

At stage 1320, the gNB 222 requests, and the LMF 270 provides, assistance data and measurement reporting configurations for predicting future RSRP/RSRPP and/or UL-AoA measurements using an AI/ML model.

At stage 1330, the gNB 222 activates UL-AoA positioning in the UE 204 and configures the UE 204 to transmit related SRS resources.

At stage 1340, the gNB 222 obtains SRS-RSRP/RSRPP and/or UL-AoA measurements of the SRS resources transmitted by the UE 204 and predicts future SRS-RSRP/RSRPP and/or UL-AoA measurements using an AI/ML model (e.g., an AI/ML SRS beam RSRP/RSRPP temporal prediction model or an AI/ML UL-AoA temporal prediction model, as illustrated in FIG. 12).

At stage 1350, the gNB 222 reports, and the LMF 270 receives, the current SRS-RSRP/RSRPP and/or UL-AoA measurements and the predicted future SRS-RSRP/RSRPP and/or UL-AoA measurements. The gNB 222 may optionally apply Kalman smoothing to the reported current SRS-RSRP/RSRPP and/or UL-AoA measurements.

At stage 1360, the LMF 270 determines the current and predicted future positions of the UE 204 using UL-AoA positioning techniques. The LMF 270 may optionally apply Kalman smoothing to the measurements, if not performed at the gNB 222.

Note that although FIG. 13 illustrates a single gNB 222, there may be more than one gNB 222, and the illustrated gNB 222 may be the UE's 204 serving gNB 222. The other gNBs 222 (e.g., neighboring gNBs 222) may perform stages 1310, 1320, 1340, and 1350 of FIG. 13.

Referring to the operations at the base station (e.g., gNB 222 in FIG. 13) in greater detail, the base station obtains a first set of UL-AoA positioning measurements related to one or more SRS resources transmitted by a UE (e.g., as at stage 1340 of FIG. 13) and applies an AI/ML model for predicting future UL-AoA positioning measurements to the first set of measurements to predict future UL-AoA positioning measurements (e.g., future UL-AoA and/or future SRS-RSRP/RSRPP measurements) that can be sent by the UE in a future time window. That is, the predicted future UL-AoA and/or future SRS-RSRP/RSRPP measurements are estimates/predictions of what the UL-AoA and/or SRS-RSRP/RSRPP values of the measured SRS resource(s) transmitted by the UE will be at some future point in time (e.g., at some future repetition/occasion of the SRS resource(s)). The base station reports the first set of UL-AoA positioning measurements and the predicted future UL-AoA positioning measurements to a location server (e.g., as at stage 1350 of FIG. 13). In an aspect, the first set of UL-AoA positioning measurements may include one or more SRS-RSRP/RSRPP measurements, one or more UL-AoA measurements, one or more CIR measurements, one or more CFR measurements, and/or the like.

In an aspect, the base station can send, to the location server, a capability message to indicate the base station's capability to predict future UL-AoA positioning related measurements (e.g., as at stage 1310 of FIG. 13). The capability message may indicate whether the base station can accept the AI/ML model from the location server. Alternatively, the capability message may indicate whether the base station already has the AI/ML model. The capability message may further indicate the time window over which the base station can predict future UL-AoA positioning measurements.

The capability message may further indicate the required processing times needed to conduct the future measurement predictions. The capability message may indicate whether the base station can apply Kalman smoothing to enhance the first set of UL-AoA positioning measurements. The base station may receive a request, from the location server, to provide the foregoing capabilities in a capability message. The capability request/response message may be exchanged as part of an NRPPa TRP Information Exchange Procedure.

In an aspect, the base station may receive assistance information from the location server that configures the prediction of future UL-AoA measurements (e.g., as at stage 1320 of FIG. 13). The assistance information may configure the reporting quantity and/or periodicity of current and predicted future UL-AoA measurements. The assistance information may further include details on how the base station may obtain the AI/ML model. The assistance information may further configure the base station to apply Kalman smoothing to the first set of UL-AoA positioning measurements.

In an aspect, the base station may send a request, to the location server, to request the location server to send the assistance information. In an aspect, the assistance information may be sent as part of an NRPPa Assistance Information Transfer Procedure or a Measurement Preconfiguration Exchange Procedure.

Referring to the operations at the location server (e.g., LMF 270 in FIG. 13) in greater detail, the location server receives, from a base station (e.g., gNB 222 in FIG. 13), a first set of UL-AoA positioning measurements and future UL-AoA positioning measurements (e.g., future AoA and/or SRS RSRP/RSRPP measurements), as at stage 1350 of FIG. 13. The future UL-AoA positioning measurements may have been obtained at the base station using an AI/ML model. The location server may use the first set of UL-AoA positioning measurements and the future UL-AoA positioning measurements to compute a target UE's location using UL-AoA positioning techniques. In an aspect, the first set of UL-AoA positioning measurements may include one or more SRS-RSRP/RSRPP measurements, one or more UL-AoA measurements, one or more CIR measurements, one or more CFR measurements, and/or the like.

In an aspect, the location server may receive, from the base station, a capability message to indicate the base station's capabilities to predict future UL-AoA positioning measurements (e.g., as at stage 1310 of FIG. 13). The capability message may indicate whether the base station can accept the AI/ML model from the location server. Alternatively, the capability message may indicate whether the base station already has the AI/ML model. The capability message may further indicate the time window during which it can predict future UL-AoA positioning measurements. The capability message may further indicate the required processing times needed to conduct the prediction. The capability message may further indicate whether the base station can apply Kalman smoothing to enhance the first set of UL-AoA positioning measurements. In an aspect, the location server may send, to the base station, a request to provide the capability message. In an aspect, the capability request/response message may be exchanged as part of an NRPPa TRP Information Exchange Procedure.

In an aspect, the location server can send, to the base station, an assistance information message that configures the prediction of future UL-AoA measurements (e.g., as at stage 1320 of FIG. 13). The assistance information message may configure the reporting periodicity and quantity (e.g., individual versus bulk measurement reporting) of current and predicted future UL-AoA measurements. The assistance information message may further include details on how the base station may obtain the AI/ML model. The assistance information message may further configure the base station to apply Kalman smoothing to the first set of UL-AoA positioning measurements. In an aspect, the location server may receive, from the base station, a request to send the assistance information message. In an aspect, the assistance information message may be provided as part of an NRPPa Assistance Information Transfer Procedure or a Measurement Preconfiguration Exchange Procedure.

UL-TDoA positioning relies on determining the RTOAs between TRPs and a UE to position the UE. The NG-RAN nodes (e.g., gNBs/TRPs) measure the RTOAs and report them to the location server (e.g., LMF 270), which utilizes them to position the UE. The NR UL-TDoA positioning framework (over NRPPa) currently depends on the instantaneous RTOA measurements but does not support reporting future predictions of these measurements.

There are various benefits to predicting future RTOAs. For example, future RTOA predictions can enhance the instantaneous estimates of the measured RTOAs by applying smoothing-like techniques using the predicted future RTOAs (e.g., Kalman smoothing), thereby improving accuracy. As another example, predicting future RTOAs can reduce the number of SRS resources the UE needs to transmit, thereby reducing UE power consumption (i.e., power saving). As in the foregoing techniques described herein, AI/ML can be used to produce accurate predictions for future RTOA measurements. However, currently, NRPPa does not support the reporting/signaling of future RTOAs that are predicted by a gNB/TRP-sided AI/ML prediction model.

The present disclosure provides techniques to enable a TRP/gNB to predict future RTOAs using an AI/ML prediction model and report them over the NRPPa interface (and optionally relative ToAs of multipaths). These techniques provide the advantage of enhancing current positioning, insofar as the location server can also leverage these future RTOA predictions (and optionally relative ToAs of multipaths) and/or future UE locations to enhance determination of the current UE location (e.g., using Kalman smoothing). Another advantage is reducing resource overhead and improving UE-power savings, insofar as the location server can leverage the predicted future RTOA measurements to compute future UE locations using UL-TDoA positioning. The present disclosure provides capability messaging, assistance data, and reporting configuration to support NG-RAN-assisted UL-TDoA positioning with NG-RAN-based RTOA prediction.

FIG. 14 is a diagram 1400 illustrating an example of UL-RTOA temporal prediction, according to aspects of the disclosure. As shown in FIG. 14, given a sequence of M previous SRS-based RFFP measurements (e.g., CIRs, CFRs, SRS-RSRPs, SRS-RSRPPs, UL-RTOAs, UL-RTOAs of multipaths), an AI/ML UL-TDoA temporal prediction model can predict N future UL-RTOA measurements.

Figure 15:
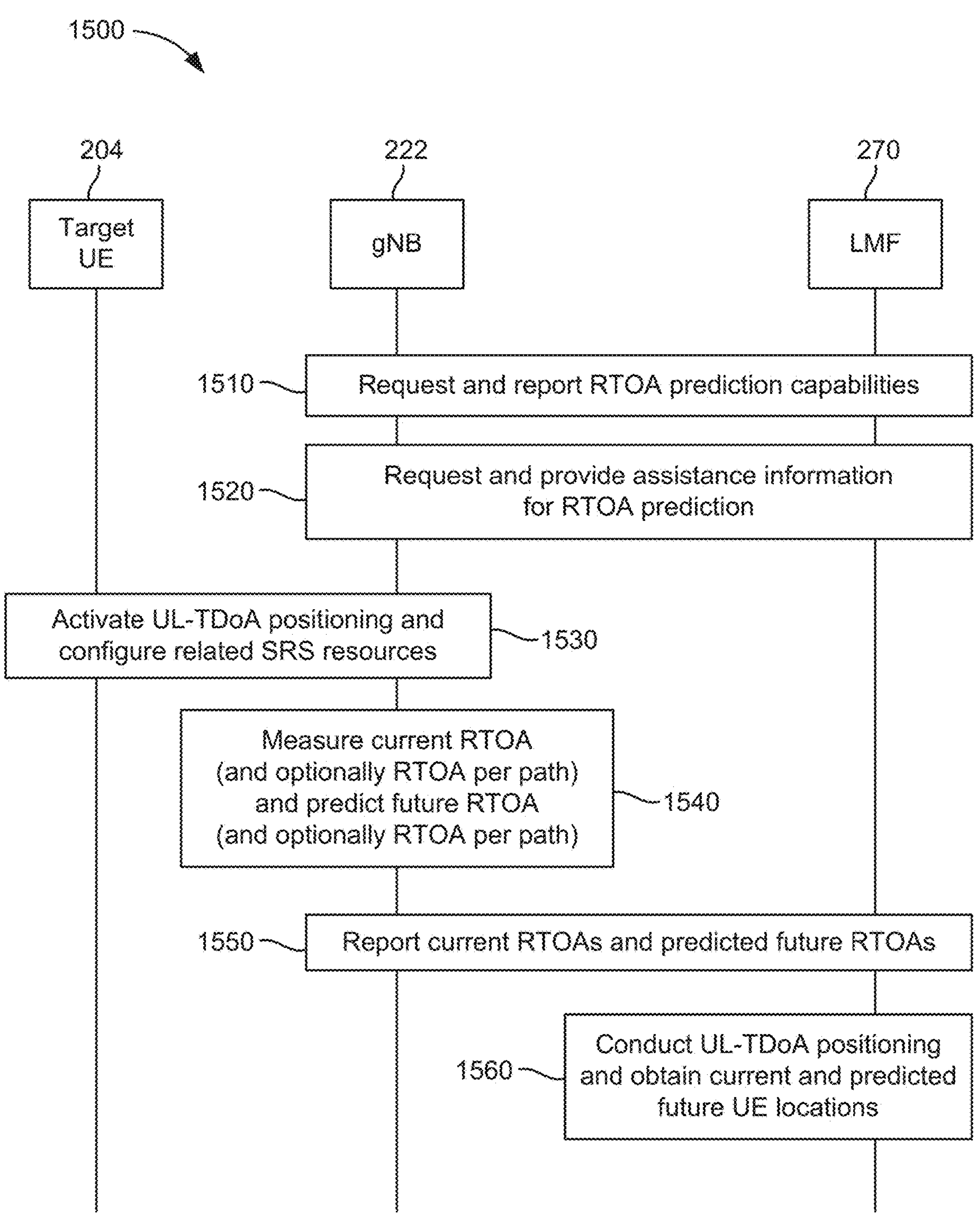
FIG. 15 is a diagram illustrating an example call flow for base station prediction of future RTOA measurements using an AI/ML prediction model, according to aspects of the disclosure.

FIG. 15 is a diagram 1500 illustrating an example call flow for gNB prediction of future RTOA measurements using an AI/ML prediction model, according to aspects of the disclosure.

At stage 1510, an LMF 270 (or other location server) requests, and a gNB 222 (or other NG-RAN node) provides, capabilities of the gNB 222 to predict future RTOA measurements using AI/ML (i.e., using an AI/ML model). The requested and provided capabilities may also include capabilities of the gNB 222 to apply Kalman smoothing to the current measurements.

At stage 1520, the gNB 222 requests, and the LMF 270 provides, assistance information and measurement reporting configurations for predicting future RTOA measurements using an AI/ML model.

At stage 1530, the gNB 222 activates UL-TDoA positioning in the UE 204 and configures the UE 204 to transmit related SRS resources.

At stage 1540, the gNB 222 obtains RTOA measurements of the SRS resources transmitted by the UE 204 and predicts future RTOA measurements using an AI/ML model (e.g., an AI/ML UL-TDOA temporal prediction model, as illustrated in FIG. 14).

At stage 1550, the gNB 222 reports, and the LMF 270 receives, the current RTOA measurements and the predicted future RTOA measurements. The gNB 222 may optionally apply Kalman smoothing to the reported current RTOA measurements.

At stage 1560, the LMF 270 determines the current and predicted future positions of the UE 204 using UL-TDoA positioning techniques. The LMF 270 may optionally apply Kalman smoothing to the measurements, if not performed at the gNB 222.

Note that although FIG. 15 illustrates a single gNB 222, there may be more than one gNB 222, and the illustrated gNB 222 may be the UE's 204 serving gNB 222. The other gNBs 222 (e.g., neighboring gNBs 222) may perform stages 1510, 1520, 1540, and 1550 of FIG. 15.

Referring to the operations at the base station (e.g., gNB 222 in FIG. 15) in greater detail, the base station can send, to the location server (e.g., LMF 270 in FIG. 15), a capability message indicating its capability to obtain UL-TDOA-related measurements (e.g., current RTOA and optionally RTOA per path) and apply an AI/ML model for predicting future RTOAs and optionally RTOA per path (e.g., as at stage 1510 of FIG. 15). The location server receives the capability message and configures UL-TDOA measurement prediction at the base station.

In an aspect, the capability message may indicate whether the base station can accept the AI/ML model from the location server. Alternatively, the capability message may indicate whether the base station already has the AI/ML model. The capability message may further indicate the processing time needed to conduct the prediction. The capability message may further indicate whether the base station can apply Kalman smoothing to enhance the UL-TDOA-related measurements. The capability message may further indicate the time window during which the base station can predict future RTOA positioning measurements (and optionally RTOA per path). In an aspect, the base station may receive a request, from the location server, to send the capability message. In an aspect, the capability request/response message may be exchanged as part of an NRPPa TRP Information Exchange Procedure for UL-TDOA positioning.

In an aspect, the base station may receive an assistance information message from the location server that configures the reporting of current and predicted future RTOAs (and optionally RTOA per path) related to UL-TDoA measurements (e.g., as at stage 1520 of FIG. 15). The assistance information message may be sent as part of an NRPPa Assistance Information Transfer Procedure or a Measurement Preconfiguration Exchange Procedure. In an aspect, the base station may send a request to the location server to send the assistance information message. In an aspect, the assistance information message may configure the reporting quantity and/or periodicity of the current and predicted future RTOAs (and optionally RTOA per path). The assistance information message may further include details on how the base station may obtain the AI/ML model. The assistance information message may further configure the base station to apply Kalman smoothing to the UL-TDOA-related measurements.

Subsequently, the base station receives one or more SRS from a UE and obtains measurements related to the SRS (e.g., RTOA or RTOA per path). The base station applies an AI/ML model to the measurements of the SRS to predict future RTOA measurements (and optionally RTOA per path) that may correspond to future UE transmissions (e.g., as at stage 1540 of FIG. 15). The base station reports the input measurements and the predicted future RTOAs (and optionally RTOA per path) and any other UL-TDoA related measurements (e.g., current RTOAs) to the location server (e.g., as at stage 1550 of FIG. 15).

Figure 16:
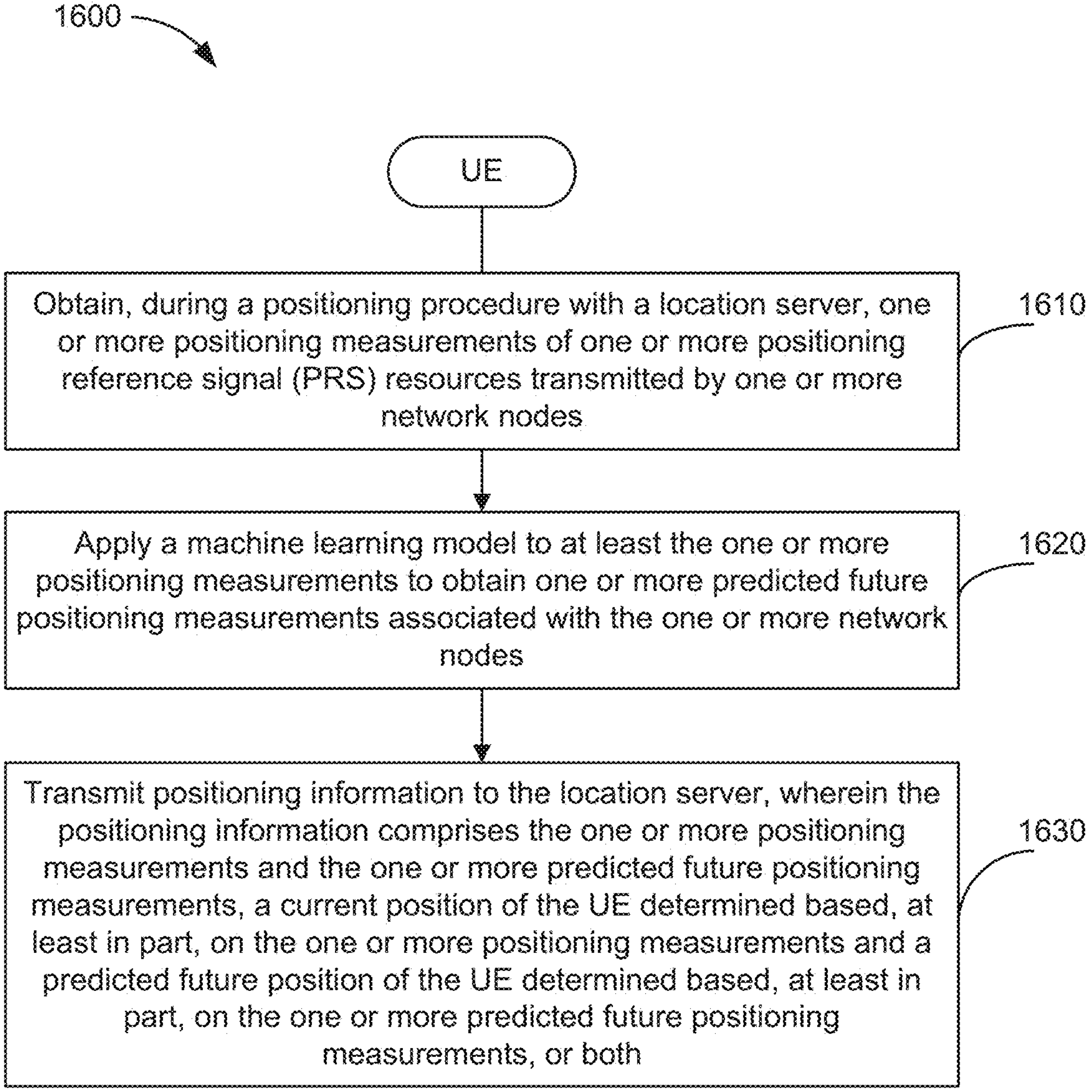
FIGS. 16 and 17 illustrate example methods of wireless communication, according to aspects of the disclosure.

FIG. 16 illustrates an example method 1600 of wireless communication, according to aspects of the disclosure. In an aspect, method 1600 may be performed by a UE (e.g., any of the UEs described herein).

At 1610, the UE obtains, during a positioning procedure with a location server (e.g., LMF 270), one or more positioning measurements of one or more PRS (e.g., DL-PRS or SL-PRS) resources transmitted by one or more network nodes (e.g., one or more TRPs, one or more sidelink UEs, etc.), as at stage 2 of diagrams 1000 and 1050 of FIG. 10. In an aspect, operation 1610 may be performed by the one or more WWAN transceivers 310, the one or more processors 332, memory 340, and/or positioning component 342, any or all of which may be considered means for performing this operation.

At 1620, the UE applies a machine learning model to at least the one or more positioning measurements to obtain one or more predicted future positioning measurements associated with the one or more network nodes, as at stage 3 of diagrams 1000 and 1050 of FIG. 10. In an aspect, operation 1620 may be performed by the one or more WWAN transceivers 310, the one or more processors 332, memory 340, and/or positioning component 342, any or all of which may be considered means for performing this operation.

At 1630, the UE transmits positioning information to the location server, as at stage 4 of diagrams 1000 and 1050 of FIG. 10, wherein the positioning information comprises the one or more positioning measurements and the one or more predicted future positioning measurements, a current position of the UE determined based, at least in part, on the one or more positioning measurements and a predicted future position of the UE determined based, at least in part, on the one or more predicted future positioning measurements, or both. In an aspect, operation 1630 may be performed by the one or more WWAN transceivers 310, the one or more processors 332, memory 340, and/or positioning component 342, any or all of which may be considered means for performing this operation.

Figure 17:
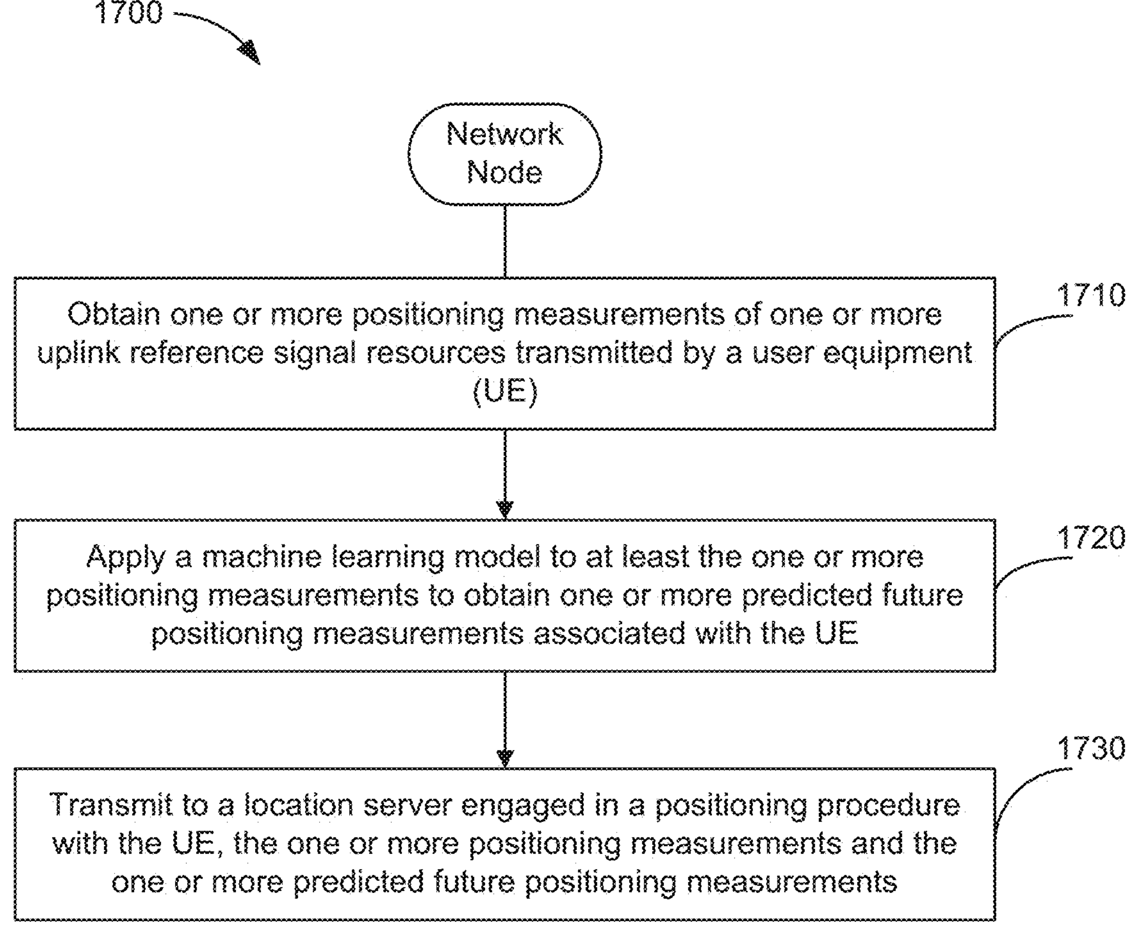

FIG. 17 illustrates an example method 1700 of wireless communication, according to aspects of the disclosure. In an aspect, method 1700 may be performed by a network node (e.g., any of the NG-RAN nodes described herein).

At 1710, the network node obtains one or more positioning measurements of one or more uplink reference signal (e.g., SRS for positioning. SL-PRS) resources transmitted by a UE (e.g., any of the UEs described herein), as at stage 1340 of FIG. 13 and stage 1540 of FIG. 15. In an aspect, operation 1710 may be performed by the one or more WWAN transceivers 350, the one or more processors 384, memory 386, and/or positioning component 388, any or all of which may be considered means for performing this operation.

At 1720, the network node applies a machine learning model to at least the one or more positioning measurements to obtain one or more predicted future positioning measurements associated with the UE, as at stage 1340 of FIG. 13 and stage 1540 of FIG. 15. In an aspect, operation 1720 may be performed by the one or more WWAN transceivers 350, the one or more processors 384, memory 386, and/or positioning component 388, any or all of which may be considered means for performing this operation.

At 1730, the network node transmits, to a location server (e.g., LMF 270) engaged in a positioning procedure with the UE, the one or more positioning measurements and the one or more predicted future positioning measurements, as at stage 1350 of FIG. 13 and stage 1550 of FIG. 15. In an aspect, operation 1730 may be performed by the one or more WWAN transceivers 350, the one or more processors 384, memory 386, and/or positioning component 388, any or all of which may be considered means for performing this operation.

As will be appreciated, technical advantages of the methods 1600 and 1700 is reduced signaling overhead (e.g., fewer/sparse PRS resources and UL-PRS resources), reduced power consumption at the UE and the network node, and provide more accurate measurements/positioning.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a user equipment (UE), comprising: obtaining, during a positioning procedure with a location server, one or more positioning measurements of one or more positioning reference signal (PRS) resources transmitted by one or more network nodes; applying a machine learning model to at least the one or more positioning measurements to obtain one or more predicted future positioning measurements associated with the one or more network nodes; and transmitting positioning information to the location server, wherein the positioning information comprises the one or more positioning measurements and the one or more predicted future positioning measurements, a current position of the UE determined based, at least in part, on the one or more positioning measurements and a predicted future position of the UE determined based, at least in part, on the one or more predicted future positioning measurements, or both.

Clause 2. The method of clause 1, further comprising: transmitting, to the location server, a capability message indicating one or more capabilities of the UE to obtain the one or more predicted future positioning measurements, the predicted future position of the UE, or both.

Clause 3. The method of clause 2, wherein the one or more capabilities include: an indication of whether the UE can apply Kalman smoothing to the one or more positioning measurements, the current position of the UE, or both based on the one or more predicted future positioning measurements, an indication of whether the UE can accept the machine learning model from the location server or other network entity, an indication of whether the UE has already been configured with the machine learning model, an indication of how far into the future the UE can predict future positioning measurements, future positions of the UE, or both, an indication of whether measurement gaps are required to obtain the one or more predicted future positioning measurements, processing requirements of the UE to obtain the one or more predicted future positioning measurements, or any combination thereof.

Clause 4. The method of any of clauses 2 to 3, further comprising: receiving, from the location server, a request for the one or more capabilities of the UE.

Clause 5. The method of clause 4, wherein: the request for the one or more capabilities of the UE is received in a Long-Term Evolution (LTE) positioning protocol (LPP) Request Capabilities message, and the capability message is an LPP Provide Capabilities message.

Clause 6. The method of any of clauses 1 to 5, further comprising: receiving assistance information for the positioning procedure from the location server, wherein the assistance information is related to at least reporting the one or more predicted future positioning measurements, the predicted future position of the UE, or both.

Clause 7. The method of clause 6, wherein the assistance information comprises: an indication of how to obtain the machine learning model, a periodicity of reporting positioning measurements, predicted future measurements, or both, a quantity of reporting positioning measurements, predicted future positioning measurements, or both, an indication of whether to apply Kalman smoothing to the one or more positioning measurements, the current position of the UE, or both, any combination thereof.

Clause 8. The method of clause 7, wherein the quantity of reporting the positioning measurements, the predicted future positioning measurements, or both comprises: individual quantity reporting of the positioning measurements, the predicted future positioning measurements, or both, or batch quantity reporting of the positioning measurements, the predicted future positioning measurements, or both.

Clause 9. The method of any of clauses 6 to 8, wherein the assistance information is received in an LPP Provide Assistance Data message.

Clause 10. The method of any of clauses 1 to 9, further comprising: receiving, from the location server, a request to report the one or more predicted future positioning measurements, the predicted future position of the UE, or both.

Clause 11. The method of clause 10, wherein: the request to report the one or more predicted future positioning measurements, the predicted future position of the UE, or both is an LPP Request Location Information message, and the positioning information is transmitted in an LPP Provide Location Information message.

Clause 12. The method of any of clauses 1 to 11, further comprising: applying Kalman smoothing to the one or more positioning measurements based on the one or more predicted future positioning measurements.

Clause 13. The method of any of clauses 1 to 12, further comprising: applying the machine learning model to one or more other measurements of the one or more PRS resources to obtain the one or more predicted future positioning measurements associated with the one or more network nodes.

Clause 14. The method of clause 13, wherein the one or more other measurements comprise: one or more channel impulse response (CIR) measurements, one or more channel energy response (CER) measurements, one or more channel frequency response (CFR) measurements, one or more power delay profile (PDP) measurements, one or more delay profile (DP) measurements, or any combination thereof.

Clause 15. The method of any of clauses 1 to 14, wherein: the positioning procedure is a downlink time-difference of arrival (DL-TDOA) positioning procedure, the one or more positioning measurements comprise one or more reference signal time difference (RSTD) measurements, one or more RSTD per path measurements, or both, and the one or more predicted future positioning measurements comprise one or more predicted future RSTD measurements, one or more predicted future RSTD per path measurements, or both.

Clause 16. The method of any of clauses 1 to 14, wherein: the positioning procedure is a downlink angle of departure (DL-AoD) positioning procedure, the one or more positioning measurements comprise one or more reference signal received power (RSRP) measurements, one or more reference signal received path power (RSRPP) measurements, or both, and the one or more predicted future positioning measurements comprise one or more predicted future RSRP measurements, one or more predicted future RSRPP measurements, or both.

Clause 17. The method of any of clauses 1 to 16, wherein the one or more network nodes comprise: one or more transmission-reception points (TRPs), one or more other UEs, or any combination thereof.

Clause 18. A method of wireless communication performed by a network node, comprising: obtaining one or more positioning measurements of one or more uplink reference signal resources transmitted by a user equipment (UE); applying a machine learning model to at least the one or more positioning measurements to obtain one or more predicted future positioning measurements associated with the UE; and transmitting, to a location server engaged in a positioning procedure with the UE, the one or more positioning measurements and the one or more predicted future positioning measurements.

Clause 19. The method of clause 18, further comprising: transmitting, to the location server, a capability message indicating one or more capabilities of the network node to obtain the one or more predicted future positioning measurements.

Clause 20. The method of clause 19, wherein the one or more capabilities include: an indication of whether the network node can apply Kalman smoothing to the one or more positioning measurements based on the one or more predicted future positioning measurements, an indication of whether the network node can accept the machine learning model from the location server or other network entity, an indication of whether the network node has already been configured with the machine learning model, an indication of how far into the future the network node can predict future positioning measurements, processing requirements of the network node to obtain the one or more predicted future positioning measurements, or any combination thereof.

Clause 21. The method of any of clauses 19 to 20, further comprising: receiving, from the location server, a request for the one or more capabilities of the network node.

Clause 22. The method of any of clauses 18 to 21, further comprising: receiving assistance information from the location server, wherein the assistance information is related to at least reporting the one or more predicted future positioning measurements.

Clause 23. The method of clause 22, wherein the assistance information comprises: an indication of how to obtain the machine learning model, a periodicity of reporting positioning measurements, predicted future measurements, or both, a quantity of reporting positioning measurements, predicted future positioning measurements, or both, an indication of whether to apply Kalman smoothing to the one or more positioning measurements, any combination thereof.

Clause 24. The method of any of clauses 18 to 23, further comprising: applying Kalman smoothing to the one or more positioning measurements based on the one or more predicted future positioning measurements.

Clause 25. The method of any of clauses 18 to 24, further comprising: applying the machine learning model to one or more other measurements of the one or more uplink reference signal resources to obtain the one or more predicted future positioning measurements associated with the UE.

Clause 26. The method of clause 25, wherein the one or more other measurements comprise: one or more channel impulse response (CIR) measurements, one or more channel energy response (CER) measurements, one or more channel frequency response (CFR) measurements, one or more power delay profile (PDP) measurements, one or more delay profile (DP) measurements, or any combination thereof.

Clause 27. The method of any of clauses 18 to 26, wherein: the positioning procedure is an uplink time-difference of arrival (UL-TDOA) positioning procedure, the one or more positioning measurements comprise one or more relative time of arrival (RTOA) measurements, one or more RTOA per path measurements, or both, and the one or more predicted future positioning measurements comprise one or more predicted future RTOA measurements, one or more predicted future RTOA per path measurements, or both.

Clause 28. The method of any of clauses 18 to 26, wherein: the positioning procedure is an uplink angle of arrival (UL-AOA) positioning procedure, the one or more positioning measurements comprise one or more reference signal received power (RSRP) measurements, one or more reference signal received path power (RSRPP) measurements, or both, and the one or more predicted future positioning measurements comprise one or more predicted future RSRP measurements, one or more predicted future RSRPP measurements, or both.

Clause 29. A user equipment (UE), comprising: one or more memories; one or more transceivers; and one or more processors communicatively coupled to the one or more memories and the one or more transceivers, the one or more processors, either alone or in combination, configured to: obtain, during a positioning procedure with a location server, one or more positioning measurements of one or more positioning reference signal (PRS) resources transmitted by one or more network nodes; apply a machine learning model to at least the one or more positioning measurements to obtain one or more predicted future positioning measurements associated with the one or more network nodes; and transmit, via the one or more transceivers, positioning information to the location server, wherein the positioning information comprises the one or more positioning measurements and the one or more predicted future positioning measurements, a current position of the UE determined based, at least in part, on the one or more positioning measurements and a predicted future position of the UE determined based, at least in part, on the one or more predicted future positioning measurements, or both.

Clause 30. The UE of clause 29, wherein the one or more processors, either alone or in combination, are further configured to: transmit, via the one or more transceivers, to the location server, a capability message indicating one or more capabilities of the UE to obtain the one or more predicted future positioning measurements, the predicted future position of the UE, or both.

Clause 31. The UE of clause 30, wherein the one or more capabilities include: an indication of whether the UE can apply Kalman smoothing to the one or more positioning measurements, the current position of the UE, or both based on the one or more predicted future positioning measurements, an indication of whether the UE can accept the machine learning model from the location server or other network entity, an indication of whether the UE has already been configured with the machine learning model, an indication of how far into the future the UE can predict future positioning measurements, future positions of the UE, or both, an indication of whether measurement gaps are required to obtain the one or more predicted future positioning measurements, processing requirements of the UE to obtain the one or more predicted future positioning measurements, or any combination thereof.

Clause 32. The UE of any of clauses 30 to 31, wherein the one or more processors, either alone or in combination, are further configured to: receive, via the one or more transceivers, from the location server, a request for the one or more capabilities of the UE.

Clause 33. The UE of clause 32, wherein: the request for the one or more capabilities of the UE is received in a Long-Term Evolution (LTE) positioning protocol (LPP) Request Capabilities message, and the capability message is an LPP Provide Capabilities message.

Clause 34. The UE of any of clauses 29 to 33, wherein the one or more processors, either alone or in combination, are further configured to: receive, via the one or more transceivers, assistance information for the positioning procedure from the location server, wherein the assistance information is related to at least reporting the one or more predicted future positioning measurements, the predicted future position of the UE, or both.

Clause 35. The UE of clause 34, wherein the assistance information comprises: an indication of how to obtain the machine learning model, a periodicity of reporting positioning measurements, predicted future measurements, or both, a quantity of reporting positioning measurements, predicted future positioning measurements, or both, an indication of whether to apply Kalman smoothing to the one or more positioning measurements, the current position of the UE, or both, any combination thereof.

Clause 36. The UE of clause 35, wherein the quantity of reporting the positioning measurements, the predicted future positioning measurements, or both comprises: individual quantity reporting of the positioning measurements, the predicted future positioning measurements, or both, or batch quantity reporting of the positioning measurements, the predicted future positioning measurements, or both.

Clause 37. The UE of any of clauses 34 to 36, wherein the assistance information is received in an LPP Provide Assistance Data message.

Clause 38. The UE of any of clauses 29 to 37, wherein the one or more processors, either alone or in combination, are further configured to: receive, via the one or more transceivers, from the location server, a request to report the one or more predicted future positioning measurements, the predicted future position of the UE, or both.

Clause 39. The UE of clause 38, wherein: the request to report the one or more predicted future positioning measurements, the predicted future position of the UE, or both is an LPP Request Location Information message, and the positioning information is transmitted in an LPP Provide Location Information message.

Clause 40. The UE of any of clauses 29 to 39, wherein the one or more processors, either alone or in combination, are further configured to: apply Kalman smoothing to the one or more positioning measurements based on the one or more predicted future positioning measurements.

Clause 41. The UE of any of clauses 29 to 40, wherein the one or more processors, either alone or in combination, are further configured to: apply the machine learning model to one or more other measurements of the one or more PRS resources to obtain the one or more predicted future positioning measurements associated with the one or more network nodes.

Clause 42. The UE of clause 41, wherein the one or more other measurements comprise: one or more channel impulse response (CIR) measurements, one or more channel energy response (CER) measurements, one or more channel frequency response (CFR) measurements, one or more power delay profile (PDP) measurements, one or more delay profile (DP) measurements, or any combination thereof.

Clause 43. The UE of any of clauses 29 to 42, wherein: the positioning procedure is a downlink time-difference of arrival (DL-TDOA) positioning procedure, the one or more positioning measurements comprise one or more reference signal time difference (RSTD) measurements, one or more RSTD per path measurements, or both, and the one or more predicted future positioning measurements comprise one or more predicted future RSTD measurements, one or more predicted future RSTD per path measurements, or both.

Clause 44. The UE of any of clauses 29 to 42, wherein: the positioning procedure is a downlink angle of departure (DL-AoD) positioning procedure, the one or more positioning measurements comprise one or more reference signal received power (RSRP) measurements, one or more reference signal received path power (RSRPP) measurements, or both, and the one or more predicted future positioning measurements comprise one or more predicted future RSRP measurements, one or more predicted future RSRPP measurements, or both.

Clause 45. The UE of any of clauses 29 to 44, wherein the one or more network nodes comprise: one or more transmission-reception points (TRPs), one or more other UEs, or any combination thereof.

Clause 46. A network node, comprising: one or more memories; one or more transceivers; and one or more processors communicatively coupled to the one or more memories and the one or more transceivers, the one or more processors, either alone or in combination, configured to: obtain one or more positioning measurements of one or more uplink reference signal resources transmitted by a user equipment (UE); apply a machine learning model to at least the one or more positioning measurements to obtain one or more predicted future positioning measurements associated with the UE; and transmit, via the one or more transceivers, to a location server engaged in a positioning procedure with the UE, the one or more positioning measurements and the one or more predicted future positioning measurements.

Clause 47. The network node of clause 46, wherein the one or more processors, either alone or in combination, are further configured to: transmit, via the one or more transceivers, to the location server, a capability message indicating one or more capabilities of the network node to obtain the one or more predicted future positioning measurements.

Clause 48. The network node of clause 47, wherein the one or more capabilities include: an indication of whether the network node can apply Kalman smoothing to the one or more positioning measurements based on the one or more predicted future positioning measurements, an indication of whether the network node can accept the machine learning model from the location server or other network entity, an indication of whether the network node has already been configured with the machine learning model, an indication of how far into the future the network node can predict future positioning measurements, processing requirements of the network node to obtain the one or more predicted future positioning measurements, or any combination thereof.

Clause 49. The network node of any of clauses 47 to 48, wherein the one or more processors, either alone or in combination, are further configured to: receive, via the one or more transceivers, from the location server, a request for the one or more capabilities of the network node.

Clause 50. The network node of any of clauses 46 to 49, wherein the one or more processors, either alone or in combination, are further configured to: receive, via the one or more transceivers, assistance information from the location server, wherein the assistance information is related to at least reporting the one or more predicted future positioning measurements.

Clause 51. The network node of clause 50, wherein the assistance information comprises: an indication of how to obtain the machine learning model, a periodicity of reporting positioning measurements, predicted future measurements, or both, a quantity of reporting positioning measurements, predicted future positioning measurements, or both, an indication of whether to apply Kalman smoothing to the one or more positioning measurements, any combination thereof.

Clause 52. The network node of any of clauses 46 to 51, wherein the one or more processors, either alone or in combination, are further configured to: apply Kalman smoothing to the one or more positioning measurements based on the one or more predicted future positioning measurements.

Clause 53. The network node of any of clauses 46 to 52, wherein the one or more processors, either alone or in combination, are further configured to: apply the machine learning model to one or more other measurements of the one or more uplink reference signal resources to obtain the one or more predicted future positioning measurements associated with the UE.

Clause 54. The network node of clause 53, wherein the one or more other measurements comprise: one or more channel impulse response (CIR) measurements, one or more channel energy response (CER) measurements, one or more channel frequency response (CFR) measurements, one or more power delay profile (PDP) measurements, one or more delay profile (DP) measurements, or any combination thereof.

Clause 55. The network node of any of clauses 46 to 54, wherein: the positioning procedure is an uplink time-difference of arrival (UL-TDOA) positioning procedure, the one or more positioning measurements comprise one or more relative time of arrival (RTOA) measurements, one or more RTOA per path measurements, or both, and the one or more predicted future positioning measurements comprise one or more predicted future RTOA measurements, one or more predicted future RTOA per path measurements, or both.

Clause 56. The network node of any of clauses 46 to 54, wherein: the positioning procedure is an uplink angle of arrival (UL-AOA) positioning procedure, the one or more positioning measurements comprise one or more reference signal received power (RSRP) measurements, one or more reference signal received path power (RSRPP) measurements, or both, and the one or more predicted future positioning measurements comprise one or more predicted future RSRP measurements, one or more predicted future RSRPP measurements, or both.

Clause 57. A user equipment (UE), comprising: means for obtaining, during a positioning procedure with a location server, one or more positioning measurements of one or more positioning reference signal (PRS) resources transmitted by one or more network nodes; means for applying a machine learning model to at least the one or more positioning measurements to obtain one or more predicted future positioning measurements associated with the one or more network nodes; and means for transmitting positioning information to the location server, wherein the positioning information comprises the one or more positioning measurements and the one or more predicted future positioning measurements, a current position of the UE determined based, at least in part, on the one or more positioning measurements and a predicted future position of the UE determined based, at least in part, on the one or more predicted future positioning measurements, or both.

Clause 58. The UE of clause 57, further comprising: means for transmitting, to the location server, a capability message indicating one or more capabilities of the UE to obtain the one or more predicted future positioning measurements, the predicted future position of the UE, or both.

Clause 59. The UE of clause 58, wherein the one or more capabilities include: an indication of whether the UE can apply Kalman smoothing to the one or more positioning measurements, the current position of the UE, or both based on the one or more predicted future positioning measurements, an indication of whether the UE can accept the machine learning model from the location server or other network entity, an indication of whether the UE has already been configured with the machine learning model, an indication of how far into the future the UE can predict future positioning measurements, future positions of the UE, or both, an indication of whether measurement gaps are required to obtain the one or more predicted future positioning measurements, processing requirements of the UE to obtain the one or more predicted future positioning measurements, or any combination thereof.

Clause 60. The UE of any of clauses 58 to 59, further comprising: means for receiving, from the location server, a request for the one or more capabilities of the UE.

Clause 61. The UE of clause 60, wherein: the request for the one or more capabilities of the UE is received in a Long-Term Evolution (LTE) positioning protocol (LPP) Request Capabilities message, and the capability message is an LPP Provide Capabilities message.

Clause 62. The UE of any of clauses 57 to 61, further comprising: means for receiving assistance information for the positioning procedure from the location server, wherein the assistance information is related to at least reporting the one or more predicted future positioning measurements, the predicted future position of the UE, or both.

Clause 63. The UE of clause 62, wherein the assistance information comprises: an indication of how to obtain the machine learning model, a periodicity of reporting positioning measurements, predicted future measurements, or both, a quantity of reporting positioning measurements, predicted future positioning measurements, or both, an indication of whether to apply Kalman smoothing to the one or more positioning measurements, the current position of the UE, or both, any combination thereof.

Clause 64. The UE of clause 63, wherein the quantity of reporting the positioning measurements, the predicted future positioning measurements, or both comprises: individual quantity reporting of the positioning measurements, the predicted future positioning measurements, or both, or batch quantity reporting of the positioning measurements, the predicted future positioning measurements, or both.

Clause 65. The UE of any of clauses 62 to 64, wherein the assistance information is received in an LPP Provide Assistance Data message.

Clause 66. The UE of any of clauses 57 to 65, further comprising: means for receiving, from the location server, a request to report the one or more predicted future positioning measurements, the predicted future position of the UE, or both.

Clause 67. The UE of clause 66, wherein: the request to report the one or more predicted future positioning measurements, the predicted future position of the UE, or both is an LPP Request Location Information message, and the positioning information is transmitted in an LPP Provide Location Information message.

Clause 68. The UE of any of clauses 57 to 67, further comprising: means for applying Kalman smoothing to the one or more positioning measurements based on the one or more predicted future positioning measurements.

Clause 69. The UE of any of clauses 57 to 68, further comprising: means for applying the machine learning model to one or more other measurements of the one or more PRS resources to obtain the one or more predicted future positioning measurements associated with the one or more network nodes.

Clause 70. The UE of clause 69, wherein the one or more other measurements comprise: one or more channel impulse response (CIR) measurements, one or more channel energy response (CER) measurements, one or more channel frequency response (CFR) measurements, one or more power delay profile (PDP) measurements, one or more delay profile (DP) measurements, or any combination thereof.

Clause 71. The UE of any of clauses 57 to 70, wherein: the positioning procedure is a downlink time-difference of arrival (DL-TDOA) positioning procedure, the one or more positioning measurements comprise one or more reference signal time difference (RSTD) measurements, one or more RSTD per path measurements, or both, and the one or more predicted future positioning measurements comprise one or more predicted future RSTD measurements, one or more predicted future RSTD per path measurements, or both.

Clause 72. The UE of any of clauses 57 to 70, wherein: the positioning procedure is a downlink angle of departure (DL-AoD) positioning procedure, the one or more positioning measurements comprise one or more reference signal received power (RSRP) measurements, one or more reference signal received path power (RSRPP) measurements, or both, and the one or more predicted future positioning measurements comprise one or more predicted future RSRP measurements, one or more predicted future RSRPP measurements, or both.

Clause 73. The UE of any of clauses 57 to 72, wherein the one or more network nodes comprise: one or more transmission-reception points (TRPs), one or more other UEs, or any combination thereof.

Clause 74. A network node, comprising: means for obtaining one or more positioning measurements of one or more uplink reference signal resources transmitted by a user equipment (UE); means for applying a machine learning model to at least the one or more positioning measurements to obtain one or more predicted future positioning measurements associated with the UE; and means for transmitting, to a location server engaged in a positioning procedure with the UE, the one or more positioning measurements and the one or more predicted future positioning measurements.

Clause 75. The network node of clause 74, further comprising: means for transmitting, to the location server, a capability message indicating one or more capabilities of the network node to obtain the one or more predicted future positioning measurements.

Clause 76. The network node of clause 75, wherein the one or more capabilities include: an indication of whether the network node can apply Kalman smoothing to the one or more positioning measurements based on the one or more predicted future positioning measurements, an indication of whether the network node can accept the machine learning model from the location server or other network entity, an indication of whether the network node has already been configured with the machine learning model, an indication of how far into the future the network node can predict future positioning measurements, processing requirements of the network node to obtain the one or more predicted future positioning measurements, or any combination thereof.

Clause 77. The network node of any of clauses 75 to 76, further comprising: means for receiving, from the location server, a request for the one or more capabilities of the network node.

Clause 78. The network node of any of clauses 74 to 77, further comprising: means for receiving assistance information from the location server, wherein the assistance information is related to at least reporting the one or more predicted future positioning measurements.

Clause 79. The network node of clause 78, wherein the assistance information comprises: an indication of how to obtain the machine learning model, a periodicity of reporting positioning measurements, predicted future measurements, or both, a quantity of reporting positioning measurements, predicted future positioning measurements, or both, an indication of whether to apply Kalman smoothing to the one or more positioning measurements, any combination thereof.

Clause 80. The network node of any of clauses 74 to 79, further comprising: means for applying Kalman smoothing to the one or more positioning measurements based on the one or more predicted future positioning measurements.

Clause 81. The network node of any of clauses 74 to 80, further comprising: means for applying the machine learning model to one or more other measurements of the one or more uplink reference signal resources to obtain the one or more predicted future positioning measurements associated with the UE.

Clause 82. The network node of clause 81, wherein the one or more other measurements comprise: one or more channel impulse response (CIR) measurements, one or more channel energy response (CER) measurements, one or more channel frequency response (CFR) measurements, one or more power delay profile (PDP) measurements, one or more delay profile (DP) measurements, or any combination thereof.

Clause 83. The network node of any of clauses 74 to 82, wherein: the positioning procedure is an uplink time-difference of arrival (UL-TDOA) positioning procedure, the one or more positioning measurements comprise one or more relative time of arrival (RTOA) measurements, one or more RTOA per path measurements, or both, and the one or more predicted future positioning measurements comprise one or more predicted future RTOA measurements, one or more predicted future RTOA per path measurements, or both.

Clause 84. The network node of any of clauses 74 to 82, wherein: the positioning procedure is an uplink angle of arrival (UL-AOA) positioning procedure, the one or more positioning measurements comprise one or more reference signal received power (RSRP) measurements, one or more reference signal received path power (RSRPP) measurements, or both, and the one or more predicted future positioning measurements comprise one or more predicted future RSRP measurements, one or more predicted future RSRPP measurements, or both.

Clause 85. A non-transitory computer-readable medium storing computer-executable instructions that, when executed by a user equipment (UE), cause the UE to: obtain, during a positioning procedure with a location server, one or more positioning measurements of one or more positioning reference signal (PRS) resources transmitted by one or more network nodes; apply a machine learning model to at least the one or more positioning measurements to obtain one or more predicted future positioning measurements associated with the one or more network nodes; and transmit positioning information to the location server, wherein the positioning information comprises the one or more positioning measurements and the one or more predicted future positioning measurements, a current position of the UE determined based, at least in part, on the one or more positioning measurements and a predicted future position of the UE determined based, at least in part, on the one or more predicted future positioning measurements, or both.

Clause 86. The non-transitory computer-readable medium of clause 85, further comprising computer-executable instructions that, when executed by the UE, cause the UE to: transmit, to the location server, a capability message indicating one or more capabilities of the UE to obtain the one or more predicted future positioning measurements, the predicted future position of the UE, or both.

Clause 87. The non-transitory computer-readable medium of clause 86, wherein the one or more capabilities include: an indication of whether the UE can apply Kalman smoothing to the one or more positioning measurements, the current position of the UE, or both based on the one or more predicted future positioning measurements, an indication of whether the UE can accept the machine learning model from the location server or other network entity, an indication of whether the UE has already been configured with the machine learning model, an indication of how far into the future the UE can predict future positioning measurements, future positions of the UE, or both, an indication of whether measurement gaps are required to obtain the one or more predicted future positioning measurements, processing requirements of the UE to obtain the one or more predicted future positioning measurements, or any combination thereof.

Clause 88. The non-transitory computer-readable medium of any of clauses 86 to 87, further comprising computer-executable instructions that, when executed by the UE, cause the UE to: receive, from the location server, a request for the one or more capabilities of the UE.

Clause 89. The non-transitory computer-readable medium of clause 88, wherein: the request for the one or more capabilities of the UE is received in a Long-Term Evolution (LTE) positioning protocol (LPP) Request Capabilities message, and the capability message is an LPP Provide Capabilities message.

Clause 90. The non-transitory computer-readable medium of any of clauses 85 to 89, further comprising computer-executable instructions that, when executed by the UE, cause the UE to: receive assistance information for the positioning procedure from the location server, wherein the assistance information is related to at least reporting the one or more predicted future positioning measurements, the predicted future position of the UE, or both.

Clause 91. The non-transitory computer-readable medium of clause 90, wherein the assistance information comprises: an indication of how to obtain the machine learning model, a periodicity of reporting positioning measurements, predicted future measurements, or both, a quantity of reporting positioning measurements, predicted future positioning measurements, or both, an indication of whether to apply Kalman smoothing to the one or more positioning measurements, the current position of the UE, or both, any combination thereof.

Clause 92. The non-transitory computer-readable medium of clause 91, wherein the quantity of reporting the positioning measurements, the predicted future positioning measurements, or both comprises: individual quantity reporting of the positioning measurements, the predicted future positioning measurements, or both, or batch quantity reporting of the positioning measurements, the predicted future positioning measurements, or both.

Clause 93. The non-transitory computer-readable medium of any of clauses 90 to 92, wherein the assistance information is received in an LPP Provide Assistance Data message.

Clause 94. The non-transitory computer-readable medium of any of clauses 85 to 93, further comprising computer-executable instructions that, when executed by the UE, cause the UE to: receive, from the location server, a request to report the one or more predicted future positioning measurements, the predicted future position of the UE, or both.

Clause 95. The non-transitory computer-readable medium of clause 94, wherein: the request to report the one or more predicted future positioning measurements, the predicted future position of the UE, or both is an LPP Request Location Information message, and the positioning information is transmitted in an LPP Provide Location Information message.

Clause 96. The non-transitory computer-readable medium of any of clauses 85 to 95, further comprising computer-executable instructions that, when executed by the UE, cause the UE to: apply Kalman smoothing to the one or more positioning measurements based on the one or more predicted future positioning measurements.

Clause 97. The non-transitory computer-readable medium of any of clauses 85 to 96, further comprising computer-executable instructions that, when executed by the UE, cause the UE to: apply the machine learning model to one or more other measurements of the one or more PRS resources to obtain the one or more predicted future positioning measurements associated with the one or more network nodes.

Clause 98. The non-transitory computer-readable medium of clause 97, wherein the one or more other measurements comprise: one or more channel impulse response (CIR) measurements, one or more channel energy response (CER) measurements, one or more channel frequency response (CFR) measurements, one or more power delay profile (PDP) measurements, one or more delay profile (DP) measurements, or any combination thereof.

Clause 99. The non-transitory computer-readable medium of any of clauses 85 to 98, wherein: the positioning procedure is a downlink time-difference of arrival (DL-TDOA) positioning procedure, the one or more positioning measurements comprise one or more reference signal time difference (RSTD) measurements, one or more RSTD per path measurements, or both, and the one or more predicted future positioning measurements comprise one or more predicted future RSTD measurements, one or more predicted future RSTD per path measurements, or both.

Clause 100. The non-transitory computer-readable medium of any of clauses 85 to 98, wherein: the positioning procedure is a downlink angle of departure (DL-AoD) positioning procedure, the one or more positioning measurements comprise one or more reference signal received power (RSRP) measurements, one or more reference signal received path power (RSRPP) measurements, or both, and the one or more predicted future positioning measurements comprise one or more predicted future RSRP measurements, one or more predicted future RSRPP measurements, or both.

Clause 101. The non-transitory computer-readable medium of any of clauses 85 to 100, wherein the one or more network nodes comprise: one or more transmission-reception points (TRPs), one or more other UEs, or any combination thereof.

Clause 102. A non-transitory computer-readable medium storing computer-executable instructions that, when executed by a network node, cause the network node to: obtain one or more positioning measurements of one or more uplink reference signal resources transmitted by a user equipment (UE); apply a machine learning model to at least the one or more positioning measurements to obtain one or more predicted future positioning measurements associated with the UE; and transmit, to a location server engaged in a positioning procedure with the UE, the one or more positioning measurements and the one or more predicted future positioning measurements.

Clause 103. The non-transitory computer-readable medium of clause 102, further comprising computer-executable instructions that, when executed by the network node, cause the network node to: transmit, to the location server, a capability message indicating one or more capabilities of the network node to obtain the one or more predicted future positioning measurements.

Clause 104. The non-transitory computer-readable medium of clause 103, wherein the one or more capabilities include: an indication of whether the network node can apply Kalman smoothing to the one or more positioning measurements based on the one or more predicted future positioning measurements, an indication of whether the network node can accept the machine learning model from the location server or other network entity, an indication of whether the network node has already been configured with the machine learning model, an indication of how far into the future the network node can predict future positioning measurements, processing requirements of the network node to obtain the one or more predicted future positioning measurements, or any combination thereof.

Clause 105. The non-transitory computer-readable medium of any of clauses 103 to 104, further comprising computer-executable instructions that, when executed by the network node, cause the network node to: receive, from the location server, a request for the one or more capabilities of the network node.

Clause 106. The non-transitory computer-readable medium of any of clauses 102 to 105, further comprising computer-executable instructions that, when executed by the network node, cause the network node to: receive assistance information from the location server, wherein the assistance information is related to at least reporting the one or more predicted future positioning measurements.

Clause 107. The non-transitory computer-readable medium of clause 106, wherein the assistance information comprises: an indication of how to obtain the machine learning model, a periodicity of reporting positioning measurements, predicted future measurements, or both, a quantity of reporting positioning measurements, predicted future positioning measurements, or both, an indication of whether to apply Kalman smoothing to the one or more positioning measurements, any combination thereof.

Clause 108. The non-transitory computer-readable medium of any of clauses 102 to 107, further comprising computer-executable instructions that, when executed by the network node, cause the network node to: apply Kalman smoothing to the one or more positioning measurements based on the one or more predicted future positioning measurements.

Clause 109. The non-transitory computer-readable medium of any of clauses 102 to 108, further comprising computer-executable instructions that, when executed by the network node, cause the network node to: apply the machine learning model to one or more other measurements of the one or more uplink reference signal resources to obtain the one or more predicted future positioning measurements associated with the UE.

Clause 110. The non-transitory computer-readable medium of clause 109, wherein the one or more other measurements comprise: one or more channel impulse response (CIR) measurements, one or more channel energy response (CER) measurements, one or more channel frequency response (CFR) measurements, one or more power delay profile (PDP) measurements, one or more delay profile (DP) measurements, or any combination thereof.

Clause 111. The non-transitory computer-readable medium of any of clauses 102 to 110, wherein: the positioning procedure is an uplink time-difference of arrival (UL-TDOA) positioning procedure, the one or more positioning measurements comprise one or more relative time of arrival (RTOA) measurements, one or more RTOA per path measurements, or both, and the one or more predicted future positioning measurements comprise one or more predicted future RTOA measurements, one or more predicted future RTOA per path measurements, or both.

Clause 112. The non-transitory computer-readable medium of any of clauses 102 to 110, wherein: the positioning procedure is an uplink angle of arrival (UL-AOA) positioning procedure, the one or more positioning measurements comprise one or more reference signal received power (RSRP) measurements, one or more reference signal received path power (RSRPP) measurements, or both, and the one or more predicted future positioning measurements comprise one or more predicted future RSRP measurements, one or more predicted future RSRPP measurements, or both.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. For example, the functions, steps and/or actions of the method claims in accordance with the aspects of the disclosure described herein need not be performed in any particular order. Further, no component, function, action, or instruction described or claimed herein should be construed as critical or essential unless explicitly described as such. Furthermore, as used herein, the terms "set," "group," and the like are intended to include one or more of the stated elements. Also, as used herein, the terms "has," "have," "having," "comprises," "comprising," "includes," "including," and the like does not preclude the presence of one or more additional elements (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of") or the alternatives are mutually exclusive (e.g., "one or more" should not be interpreted as "one and more"). Furthermore, although components, functions, actions, and instructions may be described or claimed in the singular, the plural is contemplated unless limitation to the singular is explicitly stated. Accordingly, as used herein, the articles "a," "an," "the," and "said" are intended to include one or more of the stated elements. Additionally, as used herein, the terms "at least one" and "one or more" encompass "one" component, function, action, or instruction performing or capable of performing a described or claimed functionality and also "two or more" components, functions, actions, or instructions performing or capable of performing a described or claimed functionality in combination.

What is claimed is:

1. A method of wireless communication performed by a user equipment (UE), comprising:

obtaining, during a positioning procedure with a location server, one or more positioning measurements of one or more positioning reference signal (PRS) resources transmitted by one or more network nodes;

applying a machine learning model to at least the one or more positioning measurements to obtain one or more predicted future positioning measurements associated with the one or more network nodes; and transmitting positioning information to the location server, wherein the positioning information comprises the one or more positioning measurements and the one or more predicted future positioning measurements, a current position of the UE determined based, at least in part, on the one or more positioning measurements and a predicted future position of the UE determined based, at least in part, on the one or more predicted future positioning measurements, or both.

2. The method of claim 1, further comprising:

transmitting, to the location server, a capability message indicating one or more capabilities of the UE to obtain the one or more predicted future positioning measurements, the predicted future position of the UE, or both.

3. The method of claim 2, wherein the one or more capabilities include:

an indication of whether the UE can apply Kalman smoothing to the one or more positioning measurements, the current position of the UE, or both based on the one or more predicted future positioning measurements, an indication of whether the UE can accept the machine learning model from the location server or other network entity, an indication of whether the UE has already been configured with the machine learning model, an indication of how far into the future the UE can predict future positioning measurements, future positions of the UE, or both, an indication of whether measurement gaps are required to obtain the one or more predicted future positioning measurements, processing requirements of the UE to obtain the one or more predicted future positioning measurements, or any combination thereof.

4. The method of claim 2, further comprising:

receiving, from the location server, a request for the one or more capabilities of the UE.

5. The method of claim 4, wherein:

the request for the one or more capabilities of the UE is received in a Long-Term Evolution (LTE) positioning protocol (LPP) Request Capabilities message, and the capability message is an LPP Provide Capabilities message.

6. The method of claim 1, further comprising:

receiving assistance information for the positioning procedure from the location server, wherein the assistance information is related to at least reporting the one or more predicted future positioning measurements, the predicted future position of the UE, or both.

7. The method of claim 6, wherein the assistance information comprises:

an indication of how to obtain the machine learning model, a periodicity of reporting positioning measurements, predicted future measurements, or both, a quantity of reporting positioning measurements, predicted future positioning measurements, or both, an indication of whether to apply Kalman smoothing to the one or more positioning measurements, the current position of the UE, or both, any combination thereof.

8. The method of claim 7, wherein the quantity of reporting the positioning measurements, the predicted future positioning measurements, or both comprises:

individual quantity reporting of the positioning measurements, the predicted future positioning measurements, or both, or batch quantity reporting of the positioning measurements, the predicted future positioning measurements, or both.

9. The method of claim 6, wherein the assistance information is received in an LPP Provide Assistance Data message.

10. The method of claim 1, further comprising:

receiving, from the location server, a request to report the one or more predicted future positioning measurements, the predicted future position of the UE, or both.

11. The method of claim 10, wherein:

the request to report the one or more predicted future positioning measurements, the predicted future position of the UE, or both is an LPP Request Location Information message, and the positioning information is transmitted in an LPP Provide Location Information message.

12. The method of claim 1, further comprising:

applying Kalman smoothing to the one or more positioning measurements based on the one or more predicted future positioning measurements.

13. The method of claim 1, further comprising:

applying the machine learning model to one or more other measurements of the one or more PRS resources to obtain the one or more predicted future positioning measurements associated with the one or more network nodes.

14. The method of claim 13, wherein the one or more other measurements comprise:

one or more channel impulse response (CIR) measurements, one or more channel energy response (CER) measurements, one or more channel frequency response (CFR) measurements, one or more power delay profile (PDP) measurements, one or more delay profile (DP) measurements, or any combination thereof.

15. The method of claim 1, wherein:

the positioning procedure is a downlink time-difference of arrival (DL-TDOA) positioning procedure, the one or more positioning measurements comprise one or more reference signal time difference (RSTD) measurements, one or more RSTD per path measurements, or both, and the one or more predicted future positioning measurements comprise one or more predicted future RSTD measurements, one or more predicted future RSTD per path measurements, or both.

16. The method of claim 1, wherein:

the positioning procedure is a downlink angle of departure (DL-AoD) positioning procedure, the one or more positioning measurements comprise one or more reference signal received power (RSRP) measurements, one or more reference signal received path power (RSRPP) measurements, or both, and the one or more predicted future positioning measurements comprise one or more predicted future RSRP measurements, one or more predicted future RSRPP measurements, or both.

17. The method of claim 1, wherein the one or more network nodes comprise:

one or more transmission-reception points (TRPs), one or more other UEs, or any combination thereof.

18. A method of wireless communication performed by a network node, comprising:

obtaining one or more positioning measurements of one or more uplink reference signal resources transmitted by a user equipment (UE);

applying a machine learning model to at least the one or more positioning measurements to obtain one or more predicted future positioning measurements associated with the UE; and transmitting, to a location server engaged in a positioning procedure with the UE, the one or more positioning measurements and the one or more predicted future positioning measurements.

19. The method of claim 18, further comprising:

transmitting, to the location server, a capability message indicating one or more capabilities of the network node to obtain the one or more predicted future positioning measurements.

20. The method of claim 19, wherein the one or more capabilities include:

an indication of whether the network node can apply Kalman smoothing to the one or more positioning measurements based on the one or more predicted future positioning measurements, an indication of whether the network node can accept the machine learning model from the location server or other network entity, an indication of whether the network node has already been configured with the machine learning model, an indication of how far into the future the network node can predict future positioning measurements, processing requirements of the network node to obtain the one or more predicted future positioning measurements, or any combination thereof.

21. The method of claim 19, further comprising:

receiving, from the location server, a request for the one or more capabilities of the network node.

22. The method of claim 18, further comprising:

receiving assistance information from the location server, wherein the assistance information is related to at least reporting the one or more predicted future positioning measurements.

23. The method of claim 22, wherein the assistance information comprises:

an indication of how to obtain the machine learning model, a periodicity of reporting positioning measurements, predicted future measurements, or both, a quantity of reporting positioning measurements, predicted future positioning measurements, or both, an indication of whether to apply Kalman smoothing to the one or more positioning measurements, any combination thereof.

24. The method of claim 18, further comprising:
applying Kalman smoothing to the one or more positioning measurements based on the one or more predicted future positioning measurements.

25. The method of claim 18, further comprising:
applying the machine learning model to one or more other measurements of the one or more uplink reference signal resources to obtain the one or more predicted future positioning measurements associated with the UE.

26. The method of claim 25, wherein the one or more other measurements comprise:
one or more channel impulse response (CIR) measurements,
one or more channel energy response (CER) measurements,
one or more channel frequency response (CFR) measurements,
one or more power delay profile (PDP) measurements,
one or more delay profile (DP) measurements, or
any combination thereof.

27. The method of claim 18, wherein:
the positioning procedure is an uplink time-difference of arrival (UL-TDOA) positioning procedure,
the one or more positioning measurements comprise one or more relative time of arrival (RTOA) measurements, one or more RTOA per path measurements, or both, and
the one or more predicted future positioning measurements comprise one or more predicted future RTOA measurements, one or more predicted future RTOA per path measurements, or both.

28. The method of claim 18, wherein:
the positioning procedure is an uplink angle of arrival (UL-AOA) positioning procedure,
the one or more positioning measurements comprise one or more reference signal received power (RSRP) measurements, one or more reference signal received path power (RSRPP) measurements, or both, and
the one or more predicted future positioning measurements comprise one or more predicted future RSRP measurements, one or more predicted future RSRPP measurements, or both.

29. A user equipment (UE), comprising:
one or more memories;
one or more transceivers; and
one or more processors communicatively coupled to the one or more memories and the one or more transceivers, the one or more processors, either alone or in combination, configured to:
obtain, during a positioning procedure with a location server, one or more positioning measurements of one or more positioning reference signal (PRS) resources transmitted by one or more network nodes;
apply a machine learning model to at least the one or more positioning measurements to obtain one or more predicted future positioning measurements associated with the one or more network nodes; and
transmit, via the one or more transceivers, positioning information to the location server, wherein the positioning information comprises the one or more positioning measurements and the one or more predicted future positioning measurements, a current position of the UE determined based, at least in part, on the one or more positioning measurements and a predicted future position of the UE determined based, at least in part, on the one or more predicted future positioning measurements, or both.

30. A network node, comprising:
one or more memories;
one or more transceivers; and
one or more processors communicatively coupled to the one or more memories and the one or more transceivers, the one or more processors, either alone or in combination, configured to:
obtain one or more positioning measurements of one or more uplink reference signal resources transmitted by a user equipment (UE);
apply a machine learning model to at least the one or more positioning measurements to obtain one or more predicted future positioning measurements associated with the UE; and
transmit, via the one or more transceivers, to a location server engaged in a positioning procedure with the UE, the one or more positioning measurements and the one or more predicted future positioning measurements.

* * * * *